United States Patent
Itakura et al.

(10) Patent No.: US 7,483,063 B2
(45) Date of Patent: Jan. 27, 2009

(54) IMAGE DEFECT CORRECTION APPARATUS AND METHOD

(75) Inventors: Keijirou Itakura, Ibaraki (JP); Toshiya Fujii, Ohtsu (JP); Akiyoshi Kohno, Yokohama (JP); Yoshiaki Kato, Kusatsu (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 10/845,526

(22) Filed: May 14, 2004

(65) Prior Publication Data

US 2004/0263649 A1    Dec. 30, 2004

(30) Foreign Application Priority Data

May 15, 2003    (JP)    ............................ 2003-137758
Apr. 15, 2004    (JP)    ............................ 2004-120413

(51) Int. Cl.
*H04N 9/64*    (2006.01)
*H04N 3/14*    (2006.01)

(52) U.S. Cl. ........................................ 348/246; 348/312
(58) Field of Classification Search ................. 348/246, 348/247, 250, 616
See application file for complete search history.

(56) References Cited

U.S. PATENT DOCUMENTS

| | | | | |
|---|---|---|---|---|
| 4,400,734 A * | 8/1983 | Davy | ........................... | 348/616 |
| 5,027,218 A | 6/1991 | Ueda | | |
| 6,741,754 B2 * | 5/2004 | Hamilton, Jr. | ............... | 382/275 |
| 6,747,697 B1 * | 6/2004 | Lin et al. | .................... | 348/246 |
| 6,819,358 B1 * | 11/2004 | Kagle et al. | ................. | 348/246 |
| 6,873,728 B2 * | 3/2005 | Bernstein et al. | ............ | 382/163 |
| 6,900,836 B2 * | 5/2005 | Hamilton, Jr. | ............... | 348/241 |
| 6,987,577 B2 * | 1/2006 | Wengender | ................ | 358/1.14 |
| 2003/0043286 A1 | 3/2003 | Kato | | |

FOREIGN PATENT DOCUMENTS

| | | |
|---|---|---|
| DE | 197 34 717 A1 | 2/1999 |
| EP | 1 143 706 A2 | 10/2001 |
| EP | 1 389 771 A2 | 2/2004 |
| JP | 7-038799 | 2/1995 |

OTHER PUBLICATIONS

Meynants, Guy., et al. "A Circuit for the Correction of Pixel Defects in Image Sensors." Proceedings of the European Solid State Circuits Conference, XX, XX, 1998, pp. 312-315, XP000884997.

* cited by examiner

*Primary Examiner*—Justin P Misleh
(74) *Attorney, Agent, or Firm*—McDermott Will & Emery LLP

(57) ABSTRACT

An image defect correction apparatus that processes luminance signals output from two-dimensionally arranged light-sensitive elements via a plurality of vertical charge coupled devices and a horizontal charge coupled device in a predetermined order, outputs image information, and includes: a recording unit that records therein an X address for identifying a correction-target vertical line of pixels corresponding to a vertical charge coupled device in which a point defect exists; a correction value calculating unit that calculates a correction value from values of (i) a luminance signal corresponding to at least one pixel at a predetermined position on the correction-target vertical line identified by the X address and (ii) a luminance signal corresponding to at least one pixel at a predetermined position on another vertical line; and a correcting unit that corrects values of luminance signals corresponding to the correction-target vertical line, based on the calculated correction value.

30 Claims, 10 Drawing Sheets

TRANSFER PULSES OBSERVED DURING VERTICAL TRANSFER BY VERTICAL CCD IN MOVIE MODE

IMAGE DISPLAYED IN MOVIE MODE WITHOUT CORRECTION OF DEFECTS

WHITE LINE GENERATED DURING NORMAL TRANSFER

WHITE DEFECT GENERATED DURING TRANSFER STOP PERIOD

IMAGE DISPLAYED IN MOVIE MODE AFTER CORRECTION OF DEFECTS

TRANSFER PULSES OBSERVED DURING VERTICAL TRANSFER BY VERTICAL CCD IN STILL MODE

IMAGE DISPLAYED IN STILL MODE WITHOUT CORRECTION OF DEFECTS

IMAGE DISPLAYED IN STILL MODE AFTER CORRECTION OF DEFECTS

TRANSFER PULSES OBSERVED WHEN BLUR-BY-HAND CORRECTION FUNCTION IS PERFORMED

IMAGE DISPLAYED WHEN BLUR-BY-HAND CORRECTION FUNCTION IS PERFORMED, WITHOUT CORRECTION OF DEFECTS

IMAGE DISPLAYED WHEN BLUR-BY-HAND CORRECTION FUNCTION IS PERFORMED, AFTER CORRECTION OF DEFECTS ized light-sensitive elements via a plurality of vertical CCDs (Charge Coupled Devices) and one or more horizontal CCDs in a predetermined order, and outputs image information, and in particular to a technology for making less prominent a white line or a white defect on the displayed image that is generated from a point defect in a vertical CCD.

(2) Description of the Related Art

Imaging apparatuses, including home video cameras and digital still cameras, have come into wide use in recent years.

Some imaging apparatuses use a solid-state image sensing device, in which two-dimensionally arranged light-sensitive elements receives light and outputs luminance signals, and the luminance signals are output in a predetermined order via a plurality of vertical CCDs (Charge Coupled Devices) and one or more horizontal CCDS.

Meanwhile, such a solid-state image sensing device can represent as many as several hundreds to several thousands of pixels, and it is inevitable that a certain ratio of manufactured semiconductor wafers have substrate defects.

For the above reasons, if each manufactured product having at least one point defect were regarded as a defective product in the mass production, the yield rate would decrease prominently, and it would raise production cost. In actuality, therefore, to suppress the production cost, the standard for the defective product is relaxed so that the yield rate increases to a satisfactory level.

For example, in the mass production of solid-state image sensing devices representing approximately 500,000 pixels, a product of a solid-state image sensing device having two or three point defects in the light-sensitive elements or vertical CCDs are regarded as a conforming article.

It should be noted here that in general, a point defect in the light-sensitive elements is displayed as a white point on a displayed image, where a corresponding luminance signal always indicates a high luminance level regardless of the amount of light received.

As one example of such conventional technologies, Japanese Laid-Open Patent Application No. 2,565,261 discloses an image defect correction apparatus that stores data indicating (i) a position of a defective pixel of the solid-state image sensing device and (ii) the level of a defective component of the output signal, and corrects the defect with reference to the charge storage time.

In general, when a vertical CCD includes one point defect, all the luminance signals that pass through the point defect have high luminance levels and form a vertical line on the displayed image.

On the other hand, many of the recent imaging apparatuses have both a video shooting function and a still image shooting function, or a blur-by-hand correction function.

Japanese Laid-Open Patent Application No. 07-38799 discloses an imaging system that achieves a blur-by-hand correction function without either a deterioration of the resolution or an increase in the apparatus size or power consumption, as well as a conventional imaging system.

If a point defect is created in a light-sensitive element, an inconspicuous white point is displayed in an image. On the other hand, if a point defect is created in a vertical CCD, a vertical white line is displayed in a displayed image. Since the vertical white line is prominent, it is desirable that any correction is made to make the line inconspicuous.

In the case of a white point generated due to a point defect in a light-sensitive element, the white point can be corrected to a level where the white point becomes invisible to human eyes, by replacing pixel data of the white point with data of the surrounding pixels. This is applicable to a certain number of such point defects per product.

However, the method of replacing data of a pixel with data of the surrounding pixels cannot be applied to a white line that is displayed due to a point defect created in a vertical CCD. This is because the correction by the method substantially reduces the resolution in the horizontal direction, and as the number of pixels for correction increases, the corrected pixels become noticeable.

Meanwhile, a transfer of luminance signals includes what is called a transfer stop period during which the transfer of luminance signals from the light-sensitive elements to the vertical CCDs is stopped. The transfer stop period is, for example, two or three times the normal transfer time. If there is a point defect in a vertical CCD, output luminance signals corresponding to the point defect have values that have been increased in proportionate to the length of the transfer stop period. This generates what is called a white defect on the displayed screen that is a prominent white point and is the largest among the pixels on the vertical white line.

Also, when a still image is shot or a blur-by-hand correction function is performed to decrease the deterioration of resolution, a high-speed sweeping emission, in which luminance signals are output at a high speed, may be performed. The transfer time in the high-speed sweeping emission is, for example, one tenths the normal transfer time. Accordingly, if there is a point defect in a vertical CCD, the value of a luminance signal output in the high-speed sweeping emission is one tenths the value of a luminance signal output during the normal transfer time.

As understood from the above description, although the values of luminance signals corresponding to a vertical white line on the screen are higher than the other portions of the screen, the values are not necessarily even. That means it is desirable that a method of correcting the image defect on the screen can deal with different values of luminance signals for each vertical white line on the screen.

SUMMARY OF THE INVENTION

The object of the present invention is therefore to provide image defect correction apparatus and method that make white lines, which are generated due to the presence of a point defect in a vertical CCD, less noticeable, while suppressing substantial reduction of resolution.

(C-01) The above object is fulfilled by an image defect correction apparatus that processes luminance signals output from two-dimensionally arranged light-sensitive elements via a plurality of vertical charge coupled devices and a horizontal charge coupled device in a predetermined order, and outputs image information, the image defect correction apparatus comprising: a recording unit operable to record therein an X address for identifying a correction-target vertical line of pixels that corresponds to a vertical charge coupled device in which a point defect exists; a correction value calculating unit operable to calculate a correction value from values of (i) a luminance signal corresponding to at least one pixel at a predetermined position on the correction-target vertical line identified by the recorded X address and (ii) a luminance signal corresponding to at least one pixel at a predetermined position on another vertical line that is not a correction target; and a correcting unit operable to correct values of luminance signals corresponding to the correction-target vertical line, based on the calculated correction value.

(C-02) The above object is also fulfilled by an image defect correction method for an image defect correction apparatus that processes luminance signals output from two-dimensionally arranged light-sensitive elements via a plurality of vertical charge coupled devices and a horizontal charge coupled device in a predetermined order, and outputs image information, wherein the image defect correction apparatus includes a recording unit operable to record therein an X address for identifying a correction-target vertical line of pixels that corresponds to a vertical charge coupled device in which a point defect exists, the image defect correction method comprising: a correction value calculating step for calculating a correction value from values of (i) a luminance signal corresponding to at least one pixel at a predetermined position on the correction-target vertical line identified by the recorded X address and (ii) a luminance signal corresponding to at least one pixel at a predetermined position on another vertical line that is not a correction target; and a correcting step for correcting values of luminance signals corresponding to the correction-target vertical line, based on the calculated correction value.

(E-01) With the above-described construction, it is possible to remove the influence of the dark current generated with the presence of a point defect in a vertical CCD, from the luminance signals and make the white vertical line in the displayed image less prominent.

This enables the number of point defects in the vertical CCDs used in screening the products to be increased, improving yields and reducing the production cost.

(C-03) In the above-described image defect correction apparatus of (C-01, the correction value calculating unit may calculate, as the correction value, a difference between (a) any of (i) a value of a luminance signal corresponding to a position on the correction-target vertical line within a vertical light-shielded area that is outside an effective pixel area, (ii) a value of a luminance signal corresponding to a position on the correction-target vertical line within a vertical dummy area that does not have any light-sensitive element, and (iii) a value obtained by performing a calculation using values of (iii-1) the luminance signal corresponding to a position on the correction-target vertical line within the vertical light-shielded area, and (iii-2) the luminance signal corresponding to a position on the correction-target vertical line within the vertical dummy area, and (b) any of (iv) a value of a luminance signal corresponding to a position on another vertical line, that is not a correction target, within the vertical light-shielded area, (v) a value of a luminance signal corresponding to a position on another vertical line, that is not a correction target, within the vertical dummy area, and (vi) a value obtained by performing a calculation using values of (vi-1) the luminance signal corresponding to a position on another vertical line within the vertical light-shielded area and (vi-2) the luminance signal corresponding to a position on another vertical line within the vertical dummy area.

(C-04) In the above-described image defect correction apparatus of (C-01), the correction value calculating unit may calculate, as the correction value, (a) a difference between values of (i) a luminance signal corresponding to a position on the correction-target vertical line within a vertical light-shielded area that is outside an effective pixel area and (ii) a luminance signal corresponding to a position on another vertical line, that is not a correction target, within the vertical light-shielded area, (b) a difference between values of (iii) a value of a luminance signal corresponding to a position on the correction-target vertical line within a vertical dummy area that does not have any light-sensitive element and (iv) a luminance signal corresponding to a position on another vertical line, that is not a correction target, within the vertical dummy area, and (c) a difference between (v) a value obtained by performing a calculation using values of (v-1) the luminance signal corresponding to a position on the correction-target vertical line within the vertical light-shielded area, and (v-2) the luminance signal corresponding to a position on the correction-target vertical line within the vertical dummy area and (vi) a value obtained by performing a calculation using values of (vi-1) the luminance signal corresponding to a position on another vertical line within the vertical light-shielded area and (vi-2) the luminance signal corresponding to a position on another vertical line within the vertical dummy area.

(C-05) In the above-described image defect correction method of (C-02), the correction value calculating step may calculate, as the correction value, a difference between (a) any of (i) a value of a luminance signal corresponding to a position on the correction-target vertical line within a vertical light-shielded area that is outside an effective pixel area, (ii) a value of a luminance signal corresponding to a position on the correction-target vertical line within a vertical dummy area that does not have any light-sensitive element, and (iii) a value obtained by performing a calculation using values of (iii-1) the luminance signal corresponding to a position on the correction-target vertical line within the vertical light-shielded area, and (iii-2) the luminance signal corresponding to a position on the correction-target vertical line within the vertical dummy area, and (b) any of (iv) a value of a luminance signal corresponding to a position on another vertical line, that is not a correction target, within the vertical light-shielded area, (v) a value of a luminance signal corresponding to a position on another vertical line, that is not a correction target, within the vertical dummy area, and (vi) a value obtained by performing a calculation using values of (vi-1) the luminance signal corresponding to a position on another vertical line within the vertical light-shielded area and (vi-2) the luminance signal corresponding to a position on another vertical line within the vertical dummy area.

(C-06) In the above-described image defect correction method of (C-02), the correction value calculating step may calculate, as the correction value, (a) a difference between values of (i) a luminance signal corresponding to a position on the correction-target vertical line within a vertical light-shielded area that is outside an effective pixel area and (ii) a luminance signal corresponding to a position on another vertical line, that is not a correction target, within the vertical light-shielded area, (b) a difference between values of (iii) a value of a luminance signal corresponding to a position on the correction-target vertical line within a vertical dummy area that does not have any light-sensitive element and (iv) a luminance signal corresponding to a position on another vertical line, that is not a correction target, within the vertical dummy area, and (c) a difference between (v) a value obtained by performing a calculation using values of (v-1) the luminance signal corresponding to a position on the correction-target vertical line within the vertical light-shielded area, and (v-2) the luminance signal corresponding to a position on the correction-target vertical line within the vertical dummy area and (vi) a value obtained by performing a calculation using values of (vi-1) the luminance signal corresponding to a position on another vertical line within the vertical light-shielded area and (vi-2) the luminance signal corresponding to a position on another vertical line within the vertical dummy area.

(E-02) With the above-mentioned constructions, it is possible to calculate a correction value in correspondence with either one or both of the vertical light-shielded area and the vertical dummy area. This enables a correction value to be calculated in a stable manner without being affected by the shot image, increasing the accuracy of the correction.

(C-07) In the above-described image defect correction apparatus of (C-03), the number of transferred luminance signals in the vertical direction may be larger than the number of luminance signals in the vertical direction in a real area that is composed of the effective pixel area, the vertical light-shielded area, and the vertical dummy area, and luminance signals outside the real area include empty transfer signals that do not correspond to any portion of the real area, wherein the correction value calculating unit calculates, as the correction value, a difference between (a) any of (i) a value of a luminance signal corresponding to a position on the correction-target vertical line within a vertical light-shielded area that is outside an effective pixel area, (ii) a value of a luminance signal corresponding to a position on the correction-target vertical line within a vertical dummy area that does not have any light-sensitive element, (iii) a value of an empty transfer signal corresponding to a position on the correction-target vertical line, and (iv) a value obtained by performing a calculation using values of at least two of (iv-1) the luminance signal corresponding to a position on the correction-target vertical line within the vertical light-shielded area, (iv-2) the luminance signal corresponding to a position on the correction-target vertical line within the vertical dummy area, and (iv-3) the empty transfer signal corresponding to a position on the correction-target vertical line, and (b) any of (v) a value of a luminance signal corresponding to a position on another vertical line, that is not a correction target, within the vertical light-shielded area, (vi) a value of a luminance signal corresponding to a position on another vertical line, that is not a correction target, within the vertical dummy area, (vii) a value of an empty transfer signal corresponding to a position on another vertical line, and (viii) a value obtained by performing a calculation using values of at least two of (viii-1) the luminance signal corresponding to a position on another vertical line within the vertical light-shielded area, (viii-2) the luminance signal corresponding to a position on another vertical line within the vertical dummy area, and (viii-3) the empty transfer signal corresponding to a position on another vertical line.

(C-08) In the above-described image defect correction apparatus of (C-04), the number of transferred luminance signals in the vertical direction may be larger than the number of luminance signals in the vertical direction in a real area that is composed of the effective pixel area, the vertical light-shielded area, and the vertical dummy area, and luminance signals outside the real area include empty transfer signals that do not correspond to any portion of the real area, wherein the correction value calculating unit calculates, as the correction value, (a) a difference between values of (i) a luminance signal corresponding to a position on the correction-target vertical line within a vertical light-shielded area that is outside an effective pixel area and (ii) a luminance signal corresponding to a position on another vertical line, that is not a correction target, within the vertical light-shielded area, (b) a difference between values of (iii) a value of a luminance signal corresponding to a position on the correction-target vertical line within a vertical dummy area that does not have any light-sensitive element and (iv) a luminance signal corresponding to a position on another vertical line, that is not a correction target, within the vertical dummy area, (c) a difference between values of (v) a value of an empty transfer signal corresponding to a position on the correction-target vertical line and (vi) a value of an empty transfer signal corresponding to a position on another vertical line, or (d) a difference between (vii) a value obtained by performing a calculation using values of at least two of (vii-1) the luminance signal corresponding to a position on the correction-target vertical line within the vertical light-shielded area, (vii-2) the luminance signal corresponding to a position on the correction-target vertical line within the vertical dummy area, and (vii-3) the empty transfer signal corresponding to a position on the correction-target vertical line and (viii) a value obtained by performing a calculation using values of at least two of (viii-1) the luminance signal corresponding to a position on another vertical line within the vertical light-shielded area, (viii-2) the luminance signal corresponding to a position on another vertical line within the vertical dummy area, and (viii-3) the empty transfer signal corresponding to a position on another vertical line.

(C-09) In the above-described image defect correction method of (C-05), the number of transferred luminance signals in the vertical direction may be larger than the number of luminance signals in the vertical direction in a real area that is composed of the effective pixel area, the vertical light-shielded area, and the vertical dummy area, and luminance signals outside the real area include empty transfer signals that do not correspond to any portion of the real area, wherein the correction value calculating step calculates, as the correction value, a difference between (a) any of (i) a value of a luminance signal corresponding to a position on the correction-target vertical line within a vertical light-shielded area that is outside an effective pixel area, (ii) a value of a luminance signal corresponding to a position on the correction-target vertical line within a vertical dummy area that does not have any light-sensitive element, (iii) a value of an empty transfer signal corresponding to a position on the correction-target vertical line, and (iv) a value obtained by performing a calculation using values of at least two of (iv-1) the luminance signal corresponding to a position on the correction-target vertical line within the vertical light-shielded area, (iv-2) the luminance signal corresponding to a position on the correction-target vertical line within the vertical dummy area, and (iv-3) the empty transfer signal corresponding to a position on the correction-target vertical line, and (b) any of (v) a value of a luminance signal corresponding to a position on another vertical line, that is not a correction target, within the vertical light-shielded area, (vi) a value of a luminance signal corresponding to a position on another vertical line, that is not a correction target, within the vertical dummy area, (vii) a value of an empty transfer signal corresponding to a position on another vertical line, and (viii) a value obtained by performing a calculation using values of at least two of (viii-1) the luminance signal corresponding to a position on another vertical line within the vertical light-shielded area, (viii-2) the luminance signal corresponding to a position on another vertical line within the vertical dummy area, and (viii-3) the empty transfer signal corresponding to a position on another vertical line.

(C-10) In the above-described image defect correction method of (C-06), the number of transferred luminance signals in the vertical direction may be larger than the number of luminance signals in the vertical direction in a real area that is composed of the effective pixel area, the vertical light-shielded area, and the vertical dummy area, and luminance signals outside the real area include empty transfer signals that do not correspond to any portion of the real area, wherein the correction value calculating step calculates, as the correction value, (a) a difference between values of (i) a luminance signal corresponding to a position on the correction-target vertical line within a vertical light-shielded area that is outside an effective pixel area and (ii) a luminance signal corresponding to a position on another vertical line, that is not a correction target, within the vertical light-shielded area, (b) a difference between values of (iii) a value of a luminance signal corresponding to a position on the correction-target vertical line within a vertical dummy area that does not have any light-sensitive element and (iv) a luminance signal corresponding to a position on another vertical line, that is not a correction target, within the vertical dummy area, (c) a difference between values of (v) a value of an empty transfer signal corresponding to a position on the correction-target vertical line and (vi) a value of an empty transfer signal corresponding to a position on another vertical line, or (d) a difference between (vii) a value obtained by performing a calculation using values of at least two of (vii-1) the luminance signal corresponding to a position on the correction-target vertical line within the vertical light-shielded area, (vii-2) the luminance signal corresponding to a position on the correction-target vertical line within the vertical dummy area, and (vii-3) the empty transfer signal corresponding to a position on the correction-target vertical line and (viii) a value obtained by performing a calculation using values of at least two of (viii-1) the luminance signal corresponding to a position on another vertical line within the vertical light-shielded area, (viii-2) the luminance signal corresponding to a position on another vertical line within the vertical dummy area, and (viii-3) the empty transfer signal corresponding to a position on another vertical line.

(E-03) With the above-mentioned constructions, it is possible to calculate a correction value using empty transfer signals. This enables a correction value to be calculated in a stable manner without being affected by the shot image, increasing the accuracy of the correction.

It is also possible to remove only the errors due to the fluctuation in the time domain without the influence in the space domain, by averaging a plurality of empty transfer signals.

As understood from this, use of empty transfer signals in the calculation of a correction value provides prominent advantageous effects.

(C-11) In the above-described image defect correction apparatus of (C-07), the correcting unit may correct values of luminance signals corresponding to the correction-target vertical line, based on the calculated difference in real time.

(E-04) With the above-mentioned construction, it is possible to perform the correction in real time, which increases the accuracy of the correction since the correction is not influenced by changes in the temperature or changes over time.

(C-12) In the above-described image defect correction apparatus of (C-11), the recording unit may further record therein a y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target and (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target and (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

(E-05) With the above-mentioned construction, it is possible to calculate a difference value in correspondence with the upper or lower vertical light-shielded area or the upper or lower vertical dummy area, independently, and use the calculated difference value in the correction. This makes it possible to deal with a case where the required amount of correction in the upper portion differs from that in the lower portion.

(C-13) In the above-described image defect correction apparatus of (C-11), the recording unit may further record therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit obtains, by a predetermined calculation, either the first or second difference not having been calculated, from either the first or second difference having been calculated, and obtains, by a predetermined calculation, either the third or fourth difference not having been calculated, from either the third or fourth difference having been calculated, and correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

(E-06) With the above-mentioned construction, it is possible to calculate a difference value in correspondence with the upper or lower vertical light-shielded area or the upper or lower vertical dummy area, independently, then calculate a difference value of the other corresponding portion, correct the upper and lower portions independently. This makes it possible to deal with a case where the required amount of correction in the upper portion differs from that in the lower portion.

(C-14) In the above-described image defect correction apparatus of (C-13), the correcting unit, when a still image is shot, may obtain, by a calculation using a conversion equation that is based on a ratio between a transfer time in a high-speed sweeping emission and a normal transfer time, either the first or second difference not having been calculated, from either the first or second difference having been calculated, and obtains, by the calculation using the conversion equation, either the third or fourth difference not having been calculated, from either the third or fourth difference having been calculated.

(E-07) With the above-mentioned construction, it is possible to obtain a difference value corresponding to the high-speed sweeping emission, from a difference value corresponding to the normal transfer. It is therefore possible to deal with a case where all pixels are emitted by the high-speed sweeping emission immediately before a still image is shot.

(C-15) In the above-described image defect correction apparatus of (C-11), the recording unit may further record therein a Y address for identifying a position of the point defect on the correction-target vertical line, and the correction value calculating unit operable to calculate either (a) (a-1) a difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, where the calculated difference corresponds to a normal transfer time, and the correcting unit, when a blur-by-hand correction function is performed, obtains a difference corresponding to a high-speed sweeping emission by converting the calculated difference corresponding to the normal transfer time using a ratio between a transfer time in the high-speed sweeping emission and the normal transfer time, obtains the number of pixels that are outside the effective pixel area and emitted in the high-speed sweeping emission, and performs the correction by subtracting the calculated difference corresponding to the normal transfer time from each value of luminance signals that are among the luminance signals corresponding to the correction-target vertical line, excluding as many luminance signals adjacent to a pixel of the recorded Y address as the number of pixels emitted in the high-speed sweeping emission, and by subtracting the calculated difference corresponding to the high-speed sweeping emission from each value of luminance signals that are among the luminance signals corresponding to the correction-target vertical line and are as many luminance signals adjacent to the pixel of the recorded Y address as the number of pixels emitted in the high-speed sweeping emission.

(E-08) With the above-mentioned construction, it is possible to obtain a difference value corresponding to the high-speed sweeping emission, from a difference value corresponding to the normal transfer. It is therefore possible to correct luminance signals using the two difference values appropriately. It is therefore possible to deal with a case where pixels are emitted partially by the high-speed sweeping emission during the performance of a function that prevents resolution from deteriorating, such as the blur-by-hand correction function.

(C-16) In the above-described image defect correction apparatus of (C-01), the recording unit may further record therein a Y address for identifying a position of the point defect on the correction-target vertical line, and the correcting unit further obtains a converted correction value by converting the calculated correction value based on a ratio between a normal transfer time and a time during which a transfer of luminance values is stopped, and the correcting unit corrects a value of the point defect identified by the recorded X address and Y address, based on the converted correction value.

(E-09) With the above-mentioned construction, it is possible to calculate, from the calculated difference, a correction value for a luminance signal corresponding to the point defect. This enables the luminance signal corresponding to the point defect to be corrected appropriately.

(C-17) The above-described image defect correction apparatus of (C-01) may further comprise a point defect detecting unit operable to, prior to an image shooting, detect point defects in the vertical charge coupled devices by stopping transferring luminance signals from the light-sensitive elements to the vertical charge coupled devices and also stopping a vertical transfer from the vertical charge coupled devices to the horizontal charge coupled device for a predetermined time period, and then outputting luminance signals, where output luminance signals having values not higher than a predetermined value are regarded as the point defects, and the point defect detecting unit records into the recording unit information regarding addresses of the detected point defects.

(C-18) The above-described image defect correction method of (C-02) may further comprise a point defect detecting step for, prior to an image shooting, detecting point defects in the vertical charge coupled devices by stopping transferring luminance signals from the light-sensitive elements to the vertical charge coupled devices and also stopping a vertical transfer from the vertical charge coupled devices to the horizontal charge coupled device for a predetermined time period, and then outputting luminance signals, where output luminance signals having values not higher than a predetermined value are regarded as the point defects, and the point defect detecting step records into the recording unit information regarding addresses of the detected point defects.

(E-10) With the above-mentioned construction, it is possible to detect point defects that exist in the vertical CCDs. It is therefore possible to deal with a case where the number of point defects has increased during a predetermined period, and a case where the number of point defects has changed due to a change in the operation environment.

(C-19) In the above-described image defect correction apparatus of (C-01), the correcting unit may judge, for each luminance signal to be corrected, whether a luminance signal is saturated, and may not correct luminance signals that are judged to be saturated.

(E-11) With the above-mentioned construction, luminance signals are not corrected if it is judged, before an attempted correction, that the luminance signals are saturated. This prevents an excessive correction.

(C-20) In the above-described image defect correction apparatus of (C-01), the correcting unit may judge, for each luminance signal to be corrected, whether luminance signals surrounding the luminance signal to be corrected are saturated, and does not correct the luminance signal to be corrected if the luminance signals surrounding the luminance signal are judged to be saturated.

(E-12) With the above-mentioned construction, a luminance signal is not corrected if it is judged that the luminance signals surrounding the luminance signal are saturated. This prevents an excessive correction.

(C-21) In the above-described image defect correction apparatus of (C-01), the correcting unit may, for each luminance signal to be corrected, judge whether a luminance signal is saturated, calculate an expected value which a saturated luminance signal is expected to have if a correction is made, compare the expected value with a value of a luminance signal in a vicinity of the saturated luminance signal, and replace the value of the saturated luminance signal with the value of the luminance signal in the vicinity if the expected value of the saturated luminance signal is lower than the value of the luminance signal in the vicinity.

(E-13) With the above-mentioned construction, the value of a luminance signal is replaced with a value of a surrounding luminance signal if the luminance signal to be corrected is saturated and if it is expected that if the correction is made, the value of the luminance signal would be smaller than the value of the surrounding luminance signal. This prevents an excessive correction.

(C-22) The above-described image defect correction apparatus of (C-01) may further comprise: a mode selecting unit operable to select a standard mode or a mix mode, wherein in the standard mode, a luminance signal is output in correspondence with an electric charge output from each light-sensitive element, and in the mix mode, a luminance signal is output in correspondence with a mixture of electric charges output from a predetermined number of light-sensitive elements; an address representation converting unit operable to convert address representation for the standard mode into address representation for the mix mode if the mix mode is selected; and an address converting unit operable to convert the recorded X address into a converted X address by performing a calculation using a predetermined conversion equation on the recorded X address, wherein the converted X address conforms to the address representation for the mix mode and identifies the correction-target vertical line corresponding to the point defect, wherein the correction value calculating unit and the correcting unit use the converted X address instead of the X address if the mix mode is selected.

(E-14) With the above-mentioned construction, it is possible to deal with the mix mode in which a luminance signal is output in correspondence with a mixture of electric charges output from a predetermined number of light-sensitive elements.

DESCRIPTION OF THE PREFERRED EMBODIMENT

Embodiment 1

<Outline>

The imaging system of Embodiment 1, prior to an image shooting, detects point defects in the vertical CCDs by stopping transferring luminance signals from the light-sensitive elements to the vertical CCDs and stopping the vertical transfer for a predetermined time period and then outputting luminance signals, and during an image shooting, calculates a difference between values of luminance signals corresponding to a "vertical non-effective area", which is (i) a vertical light-shielded area that is outside an effective pixel area or (ii) a dummy area that does not have any light-sensitive element, and subtracts the calculated difference from each luminance signal corresponding to the correction-target vertical line.

This eliminates the influence of the dark current generated with the presence of a point defect in a vertical CCD, and makes the white vertical line in the displayed image less prominent.

<Construction>

Figure 1:
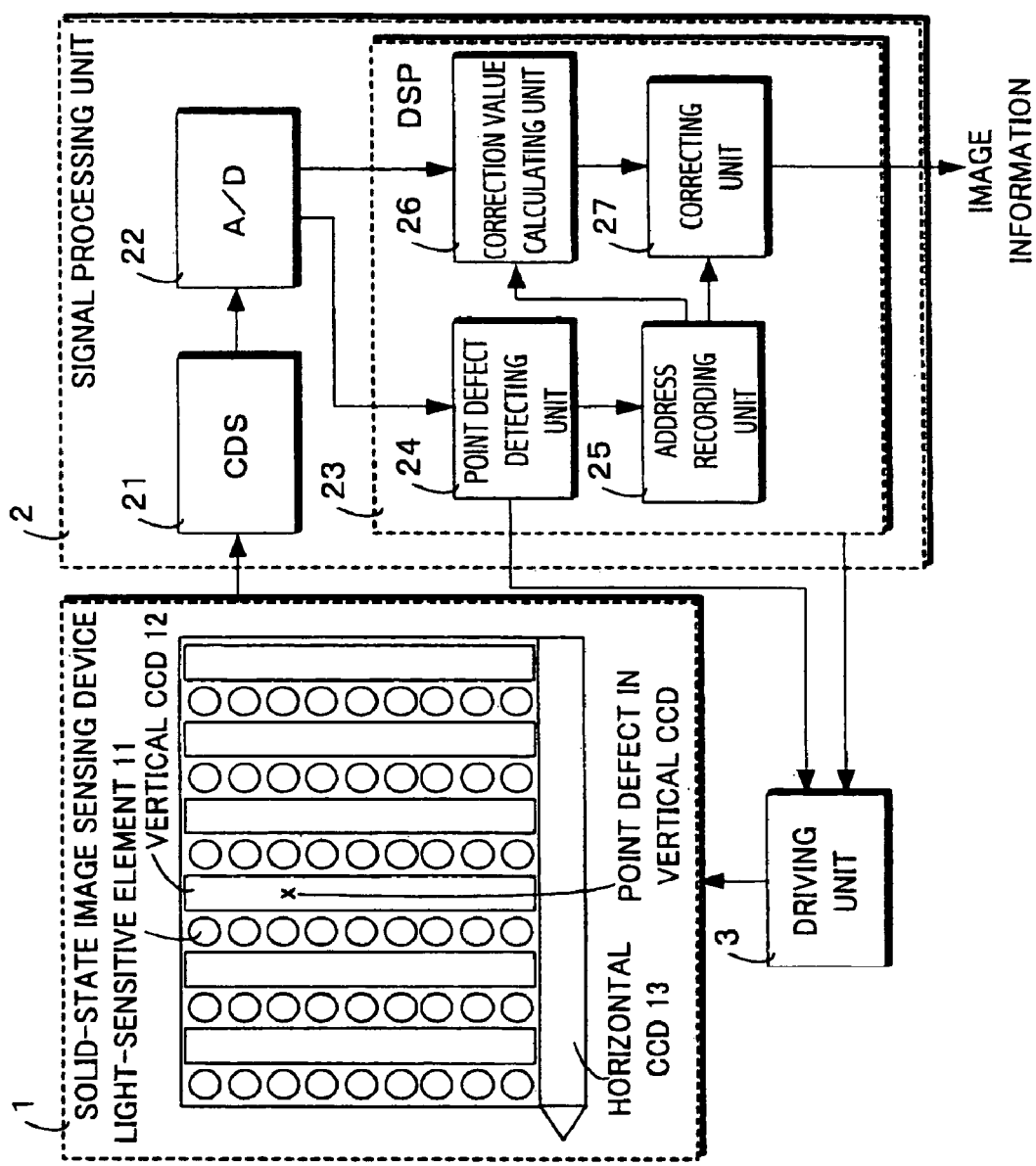
FIG. 1 shows the construction of an imaging system in Embodiment 1 of the present invention.

FIG. 1 shows the construction of an imaging system in Embodiment 1 of the present invention.

As shown in FIG. 1, the imaging system in Embodiment 1, which is embedded in an imaging apparatus such as a video camera or a digital still camera, receives light, allows the received light to pass through a lens to form an image by focusing, performs a light-to-electric conversion on the formed image, and outputs electric signals as the image information. The imaging system includes a solid-state image sensing device 1, a signal processing unit 2, and a driving unit 3.

The solid-state image sensing device 1, when driven by the driving unit 3 for an image shooting, allows light to pass through a lens (not illustrated) and reach two-dimensionally arranged light-sensitive elements, which convert the received light to electric signals that indicate luminance levels. From the light-sensitive elements, luminance signals are transferred to vertical CCDs (Charge Coupled Devices) and then output to the signal processing unit 2 via a horizontal CCD.

It should be noted here that although in the present embodiment, one horizontal CCD is used, a plurality of horizontal CCDs may be used instead.

After receiving light, each light-sensitive element outputs a voltage that is proportionate to the amount of the received light. It is supposed here that the standard output of the output voltage is approximately 350 mV to 70 mV and the maximum output is approximately 700 mV Lo 1500 mV.

It should be noted here that the standard output is a voltage output when a standard image with a predetermined luminance level is shot.

As shown in FIG. 1, the solid-state image sensing device 1 includes: two-dimensionally arranged light-sensitive elements 11 which are achieved by photodiodes or the like; a plurality of vertical CCDs 12; and a horizontal CCD 13. The solid-state image sensing device 1 outputs luminance signals to the signal processing unit 2 as follows. All luminance signals generated during a field as a result of light-to-electric conversion by the light-sensitive elements 11 are transferred to the vertical CCDs 12 all at once within the field, where the field is a predetermined time period. Then each vertical CCD 12 transfers one luminance signal to the horizontal CCD 13, which may be referred to as a vertical transfer. In other words, as many luminance signals as the number of vertical CCDs are transferred to the horizontal CCD 13 at one vertical transfer, and then are output to the signal processing unit 2. This is repeated as many times as the number of luminance signals held by each vertical CCD.

Here, the output of the luminance signals will be described in more detail by taking, as an example, a solid-state image sensing device that has a 120,000 pixel resolution (300 vertical pixels by 400 horizontal pixels). The example includes 120,000 light-sensitive elements 11, 400 vertical CCDs 12, and one horizontal CCD 13. The address of each pixel is represented by (X address, Y address)=(n, m). The pixel addresses correspond to the light-sensitive elements 11 on a one-to-one basis. The X address "n" takes a value ranging from "0" to "399", and the Y address "m" takes a value ranging from "0" to "299". In a plane in which the pixels are arranged, the X address "n" increases as the pixel position moves from left to right, and the Y address "m" increases as the pixel position moves from top to bottom. Accordingly, the upper-left pixel is represented as (0, 0), and the lower-right pixel is represented as (399, 299). In vertical transfers, the first transfer from the vertical CCDs to the horizontal CCD includes 400 luminance signals for pixels (0, 0), (1, 0), ... (399, 0) on the same horizontal line. The second transfer includes luminance signals for pixels (0, 1), (1, 1), ... (399, 1) on the same horizontal line. Transfers continue in a similar manner, and the last transfer includes luminance signals (0, 299), (1, 299), ... (399, 299) on the same horizontal line.

The signal processing unit 2, which includes an analog signal processing unit (hereinafter referred to as CDS) 21, an analog-to-digital conversion unit (hereinafter referred to as A/D) 22, and a digital signal processor (DSP) 23, issues a driving instruction to the driving unit 3, receives luminance signals output from the solid-state image sensing device 1, processes the received luminance signals, and outputs image information to outside.

The driving unit 3 drives the solid-state image sensing device 1 in accordance with a driving instruction issued by the signal processing unit 2.

The CDS 21 removes noise from the luminance signals output from the solid-state image sensing device 1, and amplifies the luminance signals.

It is supposed here that an amplification ratio of the luminance signal is set based on the standard output of the solid-state image sensing device 1 so that the standard output of the amplified luminance signal is 700 mV and ranges from 0 mV to 1500 mV. For example, when the standard output of the luminance signal from the solid-state image sensing device 1 is 350 mV, the amplification ratio is set to two times, and when the standard output of the luminance signal from the solid-state image sensing device 1 is 700 mV, the amplification ratio is set to one time.

The A/D 22 converts the amplified analog luminance signals output from the CDS 21 into digital luminance signals, and outputs the digital luminance signals.

It is supposed here that the A/D 22 converts the analog luminance signals ranging from 0 mV to 1400 mV into 10-bit digital luminance signals having values ranging from "0" to "1023".

The DSP 23 generates image information by performing digital processing on the digital luminance signals output from the A/D 22.

As shown in FIG. 1, the DSP 23 includes a point defect detecting unit 24, an address recording unit 25, a correction value calculating unit 26, and a correcting unit 27.

The point defect detecting unit 24 detects point defects in the vertical CCDs 12 prior to an image shooting. This will be described in more detail. The point defect detecting unit 24 first drives the driving unit 3 so that the solid-state image sensing device 1 stops transferring luminance signals from the light-sensitive elements 11 to the vertical CCDs 12 and also stops the vertical transfer from the vertical CCDs 12 to the horizontal CCD 13 for a predetermined time period. The point defect detecting unit 24 then allows the solid-state image sensing device 1 to output luminance signals, and searches, among digital luminance signals received from the A/D 22 in correspondence with the output analog luminance signals, for luminance signals that have values exceeding a predetermined value (hereinafter, such values exceeding the predetermined value are referred to as extra-high values). Detection of such luminance signals with extra-high values indicates the presence of a point defect in the vertical CCDs 12.

The above-mentioned predetermined time period for which the vertical transfer is stopped by the point defect detecting unit 24 is calculated as follows. It is supposed here that a normal transfer time in vertical CCDs for one pixel is 100 μs. It is also supposed here that if not less than 1% of extra-high values are included in the output luminance signals, it is judged that the extra-high values are caused by a point defect in a vertical CCD. Then, the predetermined time period for which the vertical transfer is stopped is calculated as follows.

(Standard transfer time for one pixel)/(percentage extra-high values)=100 μs/1% (1/100)=10 ms The address recording unit 25 records, in itself, addresses of point defects detected by the point defect detecting unit 24.

It should be noted here that the point defect detecting unit 24 may detect point defects before or after an image shooting. However, if there is a time-lag between the user's operation for starting an image shooting and an actual image shooting, the user might feel that the imaging apparatus is not easy to use. As a result, it is preferable that the detection of a point defect is not performed immediately before an image shooting, and, for example, the point defect detecting unit 24 detects a point defect and records the address of the point defect immediately after the user switches off the main power or stops an image shooting.

In the following description, it is presumed that a point defect A has an address (100, 100) and a point defect B has an address (300, 200).

The correction value calculating unit 26 calculates a difference between values of (i) a luminance signal that corresponds to a predetermined position on a correction-target vertical line that is identified by an X address recorded by the address recording unit 25 and (ii) a luminance signal that corresponds to a predetermined position on another vertical line around the correction-target vertical line, and sets the calculated difference as a correction value to be used for correcting the correction-target vertical line.

More specifically, the correction value calculating unit 26 calculates, during an image shooting, a difference between values of (i) a luminance signal that corresponds to the correction-target vertical line and the "upper vertical non-effective area" and (ii) a luminance signal that corresponds to a predetermined position on another vertical line around the correction-target vertical line and the "upper vertical non-effective area", and a difference between values of (i) a luminance signal that corresponds to the correction-target vertical line and the "lower vertical non-effective area" and (ii) a luminance signal that corresponds to a predetermined position on another vertical line around the correction-target vertical line and the "lower vertical non-effective area".

It should be noted here that the "non-effective areas" are areas of the screen outside an effective pixel area or dummy areas that do not have any light-sensitive element. Of these, upper and lower areas of the screen outside the effective pixel area are referred to as "vertical non-effective areas", and of these, the non-effective area located at the upper area of the screen is referred to as the "upper vertical non-effective area" and the non-effective area located at the lower area of the screen is referred to as the "lower vertical non-effective area". Also, non-effective areas located at both sides of the screen are referred to as "horizontal non-effective areas".

In the present embodiment, it is presumed that the upper vertical non-effective area ranges from (0, 0) to (399, 4), and that the lower vertical non-effective area ranges from (0, 295) to (399, 299). On this presumption, in regards with the point defect A (100, 100) that is in a vertical sequence of pixels ranging from (100, 0) to (100, 299) which the correction-target vertical line corresponds to, the correction value calculating unit 26 calculates a difference α1 between values of (i) a luminance signal of pixel (100, 2) that is on the correction-target vertical line and is within the upper vertical non-effective area aid (ii) a luminance signal of pixel (99, 2) or (101, 2) that is on another vertical line around the correction-target vertical line and is within the upper vertical non-effective area, and a difference α2 between values of (i) a luminance signal of pixel (100, 297) that is on the correction-target vertical line and is within the lower vertical non-effective area and (ii) a luminance signal of pixel (99, 297) or (101, 297) that is on another vertical line around the correction-target vertical line and is within the lower vertical non-effective area. Similarly, in regards with the point defect B (300, 200) that is in a vertical sequence of pixels ranging from (300, 0) to (300, 299) which the correction-target vertical line corresponds to, the correction value calculating unit 26 detects a difference β1 between values of (i) a luminance signal of pixel (300, 2) that is on the correction-target vertical line and is within the upper vertical non-effective area and (ii) a luminance signal of pixel (299, 2) or (301, 2) that is on another vertical line around the correction-target vertical line and is within the upper vertical non-effective area, and a difference β2 between values of (i) a luminance signal of pixel (300, 297) that is on the correction-target vertical line and is within the lower vertical non-effective area and (ii) a luminance signal of pixel (299, 297) or (301, 297) that is on another vertical line around the correction-target vertical line and is within the lower vertical non-effective area.

It should be noted here that although in the present example, the correction value calculating unit 26 calculates a difference between values of a luminance signal corresponding to the correction-target vertical line and a luminance signal corresponding to another vertical line around the correction-target vertical line, the correction value calculating unit 26 may calculate a difference between (i) a value (for example, an average value) obtained from a plurality of luminance signals corresponding to the correction-target vertical line and (ii) a value (for example, an average value) obtained from a plurality of luminance signals corresponding to another vertical line around the correction-target vertical line.

Also, it should be noted here that although in the present example, the correction value calculating unit 26 calculates, during an image shooting, a difference between values of luminance signals corresponding to a vertical non-effective area, the correction value calculating unit 26 may, prior to an image shooting, calculate and hold a difference between values of luminance signals corresponding to predetermined positions (for example, centers, upper ends, or lower ends) of the correction-target vertical line and another vertical line around the correction-target vertical line, by transferring only related luminance signals from light-sensitive elements to the vertical CCDs and performing the vertical transfer in the same manner as in image shooting.

It should also be noted here that although in the present example, the correction value calculating unit 26 calculates, as a correction value, a difference between values of luminance signals. However, the correction value calculating unit 26 may detect a value of contrast that is a ratio between values of luminance signals, and use the contrast value as the correction value in the succeeding correction process.

The correcting unit 27 corrects values of luminance signals corresponding to the correction-target vertical line by subtracting a difference, which is calculated by the correction value calculating unit 26, from each value of luminance signal corresponding to the correction-target vertical line.

In the present embodiment, the correcting unit 27 corrects values of luminance signals corresponding to the correction-target vertical line using a different correction value for each of two portions of the correction-target vertical line that are upper and lower than a detected point defect, respectively. That is to say, the correcting unit 27 corrects values of luminance signals for the upper portion of the correction-target vertical line using a difference between values of luminance signals within the upper vertical non-effective area, and corrects values of luminance signals for the lower portion of the correction-target vertical line using a difference between values of luminance signals within the lower vertical non-effective area.

More specifically, in regards with the point defect A (100, 100), the correcting unit 27 corrects values of luminance signals for pixels (100, 0) to (100, 99) corresponding to the upper portion of the correction-target vertical line, by subtracting value α1 from each luminance signal value of the 100 pixels, and corrects values of luminance signals for pixels (100, 101) to (100, 299) corresponding to the lower portion of the correction-target vertical line, by subtracting value α2 from each luminance signal value of the 199 pixels. Also, in regards with the point defect B (300,200), the correcting unit 27 corrects values of luminance signals at (300, 0) to (300, 199) corresponding to the upper portion of the correction-target vertical line, by subtracting value β1 from each luminance signal value of the 200 pixels, and corrects values of luminance signals for pixels (300, 201) to (300, 299) corresponding to the lower portion of the correction-target vertical line, by subtracting value β2 from each luminance signal value of the 99 pixels.

When the correcting unit 27 uses a value of ratio instead of difference during the correction process the luminance signal may be multiplied or divided by a value of ratio, instead of subtracting a difference from a luminance signal, so that the luminance signal is decreased.

The correcting unit 27 may store a predetermined equation and use the equation during the correction process. The predetermined equation may correspond to changes in the operation environment such as the temperature or to changes in the values of correction-target luminance signals. The predetermined equation may be created beforehand based on measurement or logic.

The reason why in the present embodiment, the correcting unit 27 uses different correction values for the upper and lower portions of the correction-target vertical line is that with this construction, it is possible to deal with a case where different amounts of extra-high values are output in correspondence with the upper and lower portions of the correction-target vertical line. For example, when a high-speed sweeping emission of electric charges is performed immediately before the transfer of luminance signals from the light-sensitive elements to the vertical CCDs, a less amount of extra-high values are output in correspondence with the upper portion than in correspondence with the lower portion of the correction-target vertical line.

Also, the correction value calculating unit 26 may calculate a difference between values for either the upper or lower portion of the correction-target vertical line, and the correcting unit 27 may obtain a difference for the other portion by performing a certain calculation. Furthermore, when the same amount of extra-high values are output for both the upper and lower portions of the correction-target vertical line, the correction value calculating unit 26 may calculate a difference between values for either the upper or lower portion, and the correcting unit 27 may use the difference for both the upper and lower portions.

More particularly, provided that the transfer time during the high-speed sweeping emission is 10 μs, the following equation holds:

(transfer time during high-speed sweeping emission)/(normal transfer time)"=10 μs/100 μs=1/10.

Also, since the amount of extra-high values output in correspondence with the upper portion is one half the amount of extra-high values output in correspondence with the lower portion, the following equation holds in the case of shooting a still image:

$$\alpha 1 \times 10 = \alpha 2$$

$$\beta 1 \times 10 = \beta 2.$$

As a result, it is possible to calculate first a difference between values for either the upper or lower portion, then calculate a difference between values for the other portion based on the above-described equations. Also, in the case of shooting a video image, since the same amount of extra-high values are output for the upper and lower portions, a difference between values calculated for either the upper or lower portion can be used for correcting the values of luminance signals corresponding to both portions.

The correcting unit 27 further obtains a correction value for a pixel at a point defect by multiplying a difference calculated by the correction value calculating unit 26 by a predetermined value, and corrects a luminance signal of the pixel at the point defect using the obtained correction value.

More specifically, provided that the predetermined time period for which the transfer of luminance signals from the light-sensitive elements to the vertical CCDs is stopped during an image shooting is 200 μs, the predetermined value used for multiplying the difference calculated by the correction value calculating unit 26 is obtained as follows:

Predetermined value for multiplication=(transfer stop period)/(normal transfer time per pixel)=200 μs/100 μs=2.

As a result, the correcting unit 27 corrects the luminance signal corresponding to the point defect A (100, 100) by subtracting α2 multiplied by 2 from the value of the luminance signal at the point defect A (100, 100), and corrects the luminance signal corresponding to the point defect B (300, 200) by subtracting β2 multiplied by 2 from the value of the luminance signal at the point defect B (300, 200).

Meanwhile, in the present embodiment, luminance signals having values not smaller than a predetermined luminance value are judged to be "saturated". For example, if a luminance signal output from the A/D 22 has a value "1023", the luminance signal is judged to be saturated.

The correcting unit 27 may perform the following for the purpose of avoiding an excessive correction. That is to say, the correcting unit 27 may judge whether a luminance signal to be corrected is saturated, and may not correct the luminance signal if it is judged to be saturated. Also, the correcting unit 27 may not correct a luminance signal if luminance signals around the luminance signal are saturated. Also, the correcting unit 27 may judge, for each of a plurality of luminance signals to be corrected, whether the luminance signal is saturated, calculates an expected luminance value which a saturated luminance signal is expected to have if the correction is made, compare the expected luminance value with a value of a luminance signal around the luminance signal of the expected luminance value, and if the expected luminance value is smaller than the value of the luminance signal around the luminance signal of the expected luminance value, may replace the value of the luminance signal of the expected luminance value with the value of the luminance signal around the-luminance signal, instead of correcting.

The driving unit 3 drives the solid-state image sensing device 1 in accordance with a driving instruction issued by the signal processing unit 2.

The driving unit 3, together with the driving instruction, receives specification of a mode that is either a movie mode or a still mode, and drives the solid-state image sensing device 1 in the specified mode.

The movie mode is a setting for shooting a video image, and the still mode is a setting for shooting a still image.

Figure 2A:
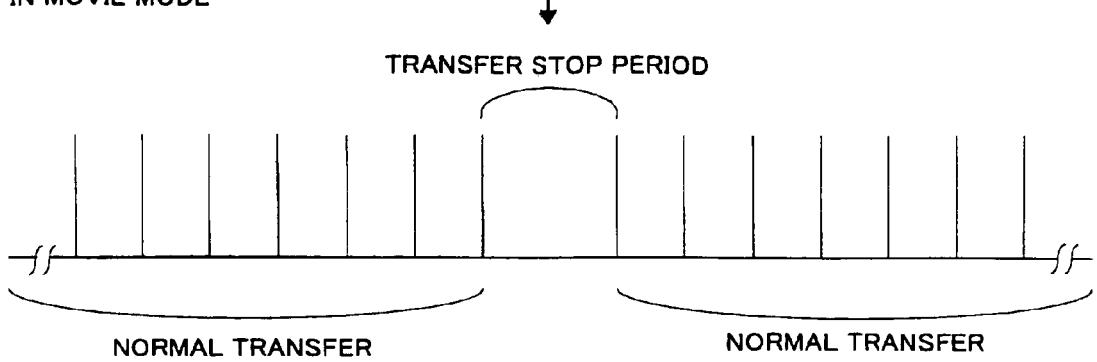
FIG. 2A is a schematic view of transfer pulses observed during the vertical transfer performed by the vertical CCDs in the movie mode.

FIG. 2A is a schematic view of transfer pulses observed during the vertical transfer performed by the vertical CCDs in the movie mode.

Figure 2B:
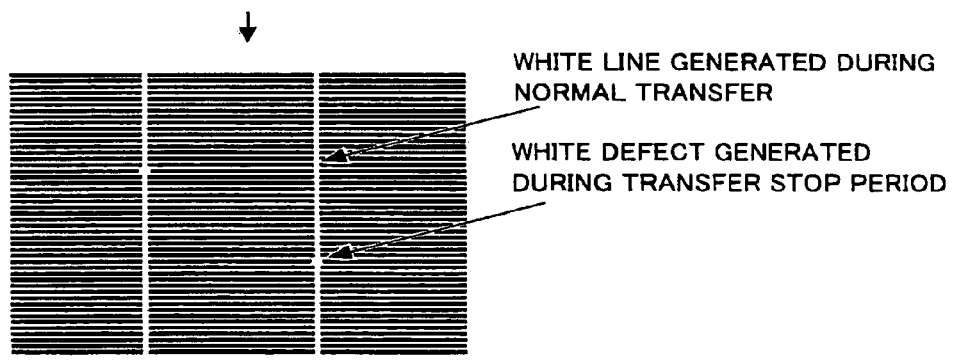
FIG. 2B is a schematic view of an image displayed in the movie mode without a correction of defects.
Figure 2C:
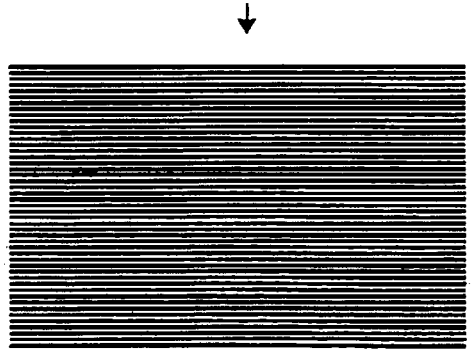
FIG. 2C is a schematic view of an image displayed in the movie mode after the defects are corrected.

FIG. 2B is a schematic view of an image displayed in the movie mode without a correction of defects. FIG. 2C is a schematic view of an image displayed in the movie mode after the defects are corrected.

In the movie mode, the speed at which luminance signals are vertically transferred is constant, and therefore the speed at which luminance signals pass through a point defect is constant. This enables luminance signals of a vertical sequence of pixels to have values that have been increased by the same value. If the luminance signals having such increased values are not corrected, an evenly bright vertical line appears in the displayed image.

Figure 3A:
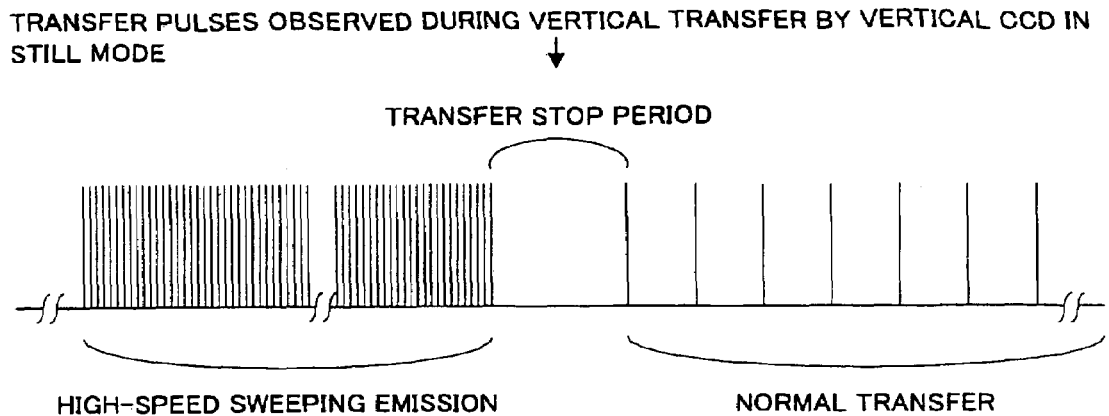
FIG. 3A is a schematic view of transfer pulses observed during the vertical transfer performed by the vertical CCDs in the still mode.

FIG. 3A is a schematic view of transfer pulses observed during the vertical transfer performed by the vertical CCDs in the still mode.

Figure 3B:
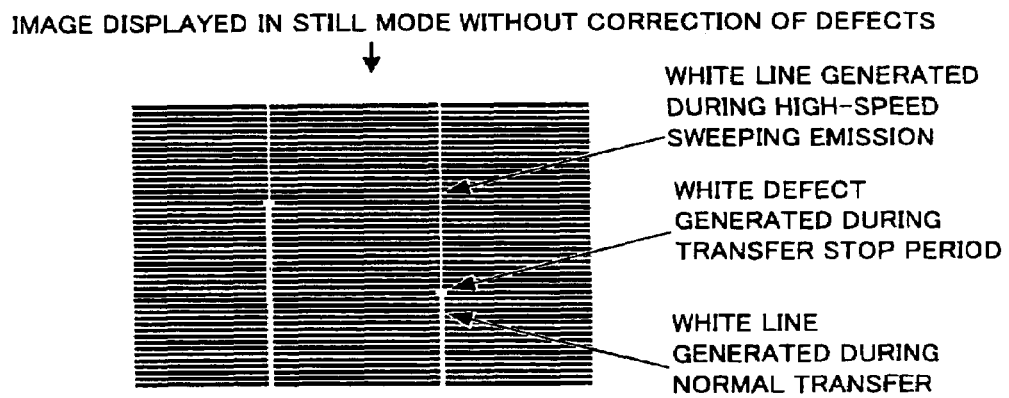
FIG. 3B is a schematic view of an image displayed in the still mode without a correction of defects.
Figure 3C:
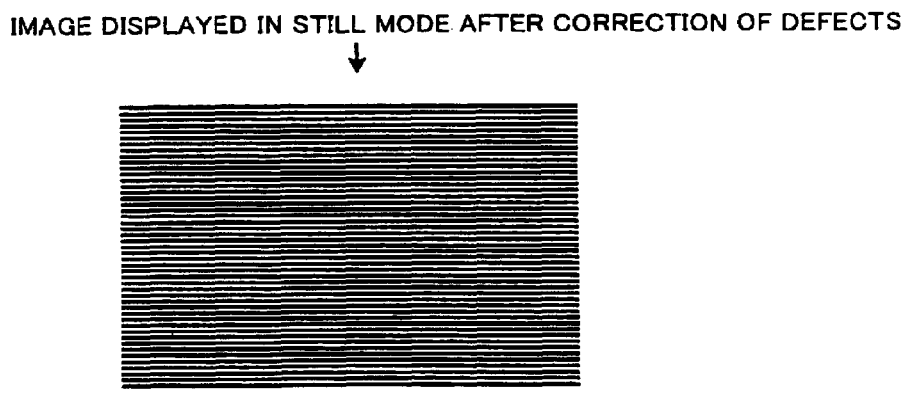
FIG. 3C is a schematic view of an image displayed in the still mode after the defects are corrected.

FIG. 3B is a schematic view of an image displayed in the still mode without a correction of defects. FIG. 3C is a schematic view of an image displayed in the still mode after the defects are corrected.

In the still mode, a high-speed sweeping emission is performed immediately before luminance signals are transferred from the light-sensitive elements 11 to the vertical CCDs 12, and therefore the speed at which luminance signals pass through a point defect is not constant. More specifically, the speed at which luminance signals of pixels higher than the point defect pass through the point defect differs from the speed at which luminance signals of pixels lower than the point defect pass through the point defect. When this happens, luminance signals of pixels higher and lower than the point defect are increased by different values. If the luminance signals having such increased values are not corrected, a vertical line that has two brightness levels appears in the displayed image.

<Operation 1>

Figure 4:
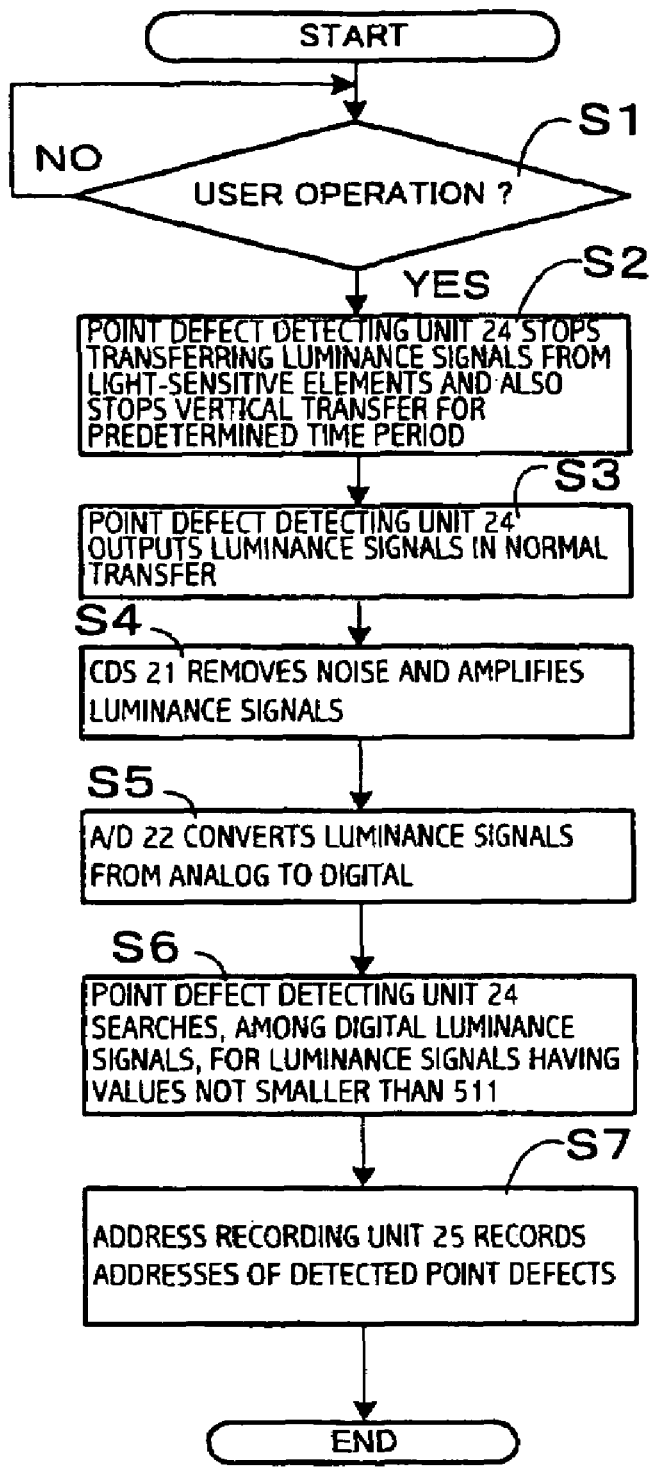
FIG. 4 shows a procedure for detecting a point defect in the vertical CCDs of the imaging system in Embodiment 1 of the present invention.

FIG. 4 shows a procedure for detecting a point defect in the vertical CCDs of the imaging system in Embodiment 1 of the present invention.

The following describes the procedure for detecting a point defect in the vertical CCDs.

(1) The imagiing system waits for the user to perform any specific operation (step S1). More specifically, the imaging system judges whether the user has performed any of (i) switching off the main power and (ii) stopping an image shooting.

(2) If it is judged that the user has performed the operation of switching off the-main power, the following operation in the step S2 is performed before the main power is turned off; and if it is judged that the user has performed the operation of stopping an image shooting, the following operation in the step S2 is performed after the image shooting is stopped. The point defect detecting unit 24 drives the driving unit 3 so that the solid-state image sensing device 1 stops transferring luminance signals from the light-sensitive elements 11 to the vertical CCDs 12 and also stops the vertical transfer from the vertical CCDs 12 to the horizontal CCD 13 for a predetermined time period (step S2). It is supposed here that after a high-speed sweeping emission is performed, the vertical transfer is stopped for 10 ms.

(3) The point defect detecting unit 24 then drives the driving unit 3 so that the solid-state image sensing device 1 outputs luminance signals in the normal transfer (step S3).

(4) The CDS 21 removes noise from the luminance signals output from the solid-state image sensing device 1, and amplifies the luminance signals (step S4).

(5) The A/D 22 converts the amplified analog luminance signals output from the CDS 21 into digital luminance signals, and outputs the digital luminance signals (step S5).

(6) The point defect detecting unit 24 searches, among digital luminance signals received from the A/D22, for luminance signals that have values not smaller than "511" that corresponds to 700 mV (step S6).

(7) The address recording unit 25 records, in itself, addresses of point defects detected by the point defect detecting unit 24 (step S7).

It is supposed here that the point defects A (100, 100) and B (300, 200) are recorded.

<Operation 2>

Figure 5:
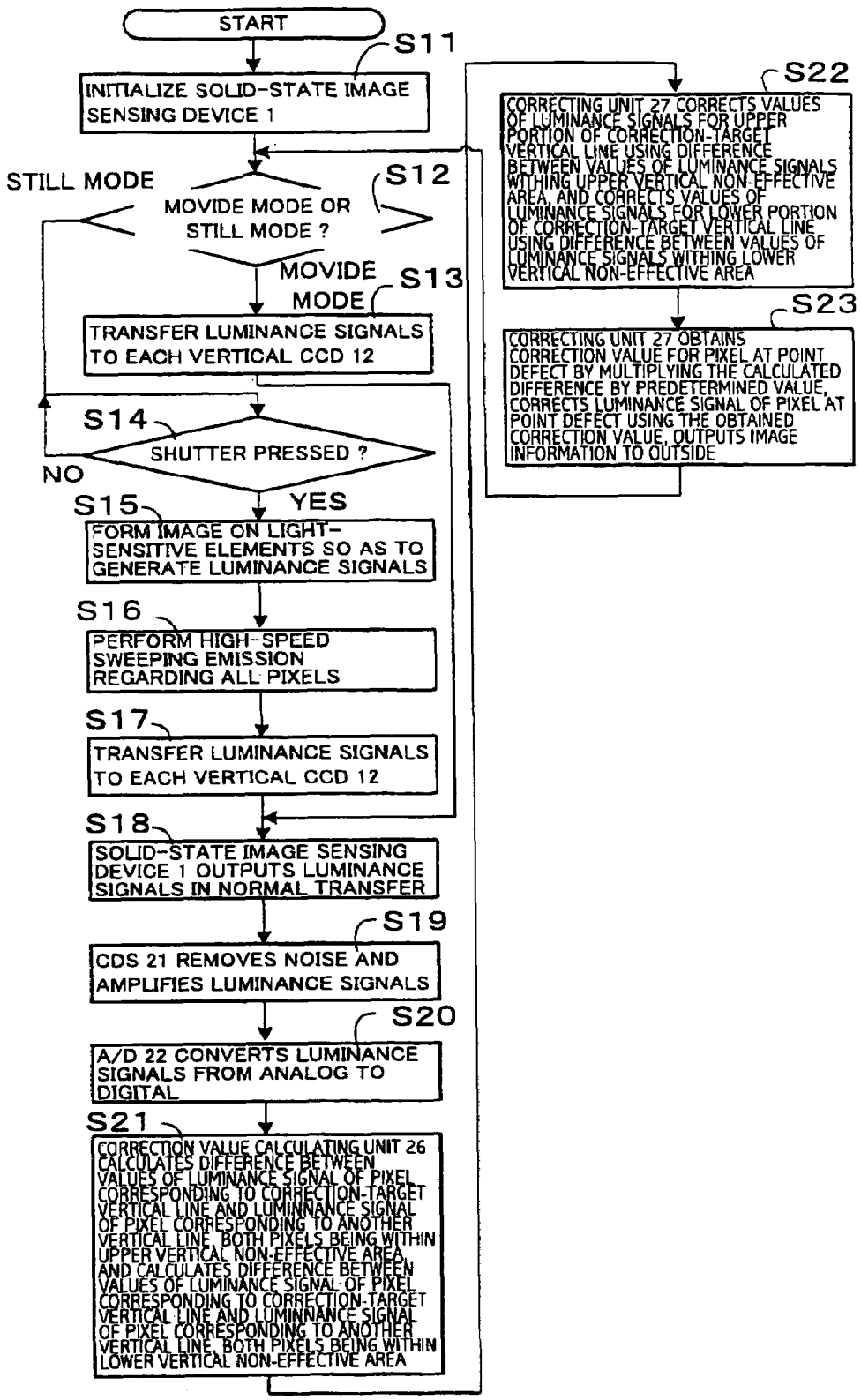
FIG. 5 shows a procedure for a first image shooting operation performed by the imaging-system in Embodiment 1 of the present invention.

FIG. 5 shows a procedure for a first image shooting operation performed by the imaging system in Embodiment 1 of the present invention.

In the first image shooting operation, a difference between values of luminance signals is calculated for each of the upper and lower vertical non-effective areas.

The following describes the procedure of the first image shooting operation.

(1) The solid-state image sensing device 1 is initialized, at the power-ON or the like (step S11). The initialization includes, for example, emission of electric charges from the light-sensitive elements 11, vertical CCDs 12, and horizontal CCD 13 or the like.

(2) It is judged whether the system is in the movie mode or the still mode (step S12).

(3) If it is judged that the system is in the movie mode, all luminance signals generated during a field as a result of light-to-electric conversion by the light-sensitive elements 11 are transferred to the vertical CCDs 12 all at once within the field (step S13).

(4) In the case of the still mode, the system waits until the user presses the shutter (step S14).

It should be noted here that in the step S14, until the shutter is pressed, a video image may be shot in the movie mode and displayed on a Liquid Crystal Display monitor (not illustrated) of the main body of the imaging device.

(5) After the shutter is pressed, light passes through a lens only for a predetermined time period corresponding to the set shutter speed, causing an image to be formed on the light-sensitive elements 11, which then performs the light-to-electric conversion on the formed image to generate luminance signals (step S15).

(6) The high-speed sweeping emission is performed in regards with all the pixels to emit electric charges from the vertical CCDs 12 and horizontal CCD 13 (step S16).

(7) The luminance signals generated in step S15 are transferred from the light-sensitive elements 11 to the vertical CCDs 12 (step S17).

(8) Regardless of the movie mode or the still mode, the solid-state image sensing device 1 outputs luminance signals in the normal transfer (step S18).

(9) The CDS 21 removes noise from the luminance signals output from the solid-state image sensing device 1, and amplifies the luminance signals (step S19).

(10) The A/D 22 converts the amplified analog luminance signals output from the CDS 21 into digital luminance signals, and outputs the digital luminance signals (step S20).

(11) The correction value calculating unit 26 calculates a difference between values of (i) a luminance signal that corresponds to a correction-target vertical line that is identified by an X address recorded by the address recording unit 25, and the pixel being within the upper vertical non-effective area and (ii) a luminance signal that corresponds to another vertical line around the correction-target vertical line and is within the upper vertical non-effective area. The correction value calculating unit 26 also calculates a difference between values of (i) a luminance signal that corresponds to the correction-target vertical line and is within the lower vertical non-effective area and (ii) a luminance signal that corresponds to another vertical line around the correction-target vertical line and is within the lower vertical non-effective area (step S21).

(12) The correcting unit 27 divides the correction-target vertical line into the upper portion and the lower portion, corrects values of luminance signals for the upper portion of the correction-target vertical line using a difference between values of luminance signals within the upper vertical non-effective area, and corrects values of luminance signals for the lower portion of the correction-target vertical line using a difference between values of luminance signals within the lower vertical non-effective area (step S22).

(13) The correcting unit 27 obtains a correction value for a pixel at a point defect by multiplying a difference calculated by the correction value calculating unit 26 by a predetermined value, corrects a luminance signal of the pixel at the point defect using the obtained correction value, outputs image information to outside, and returns to step S12 (step S23).

<Operation 3>

Figure 6:
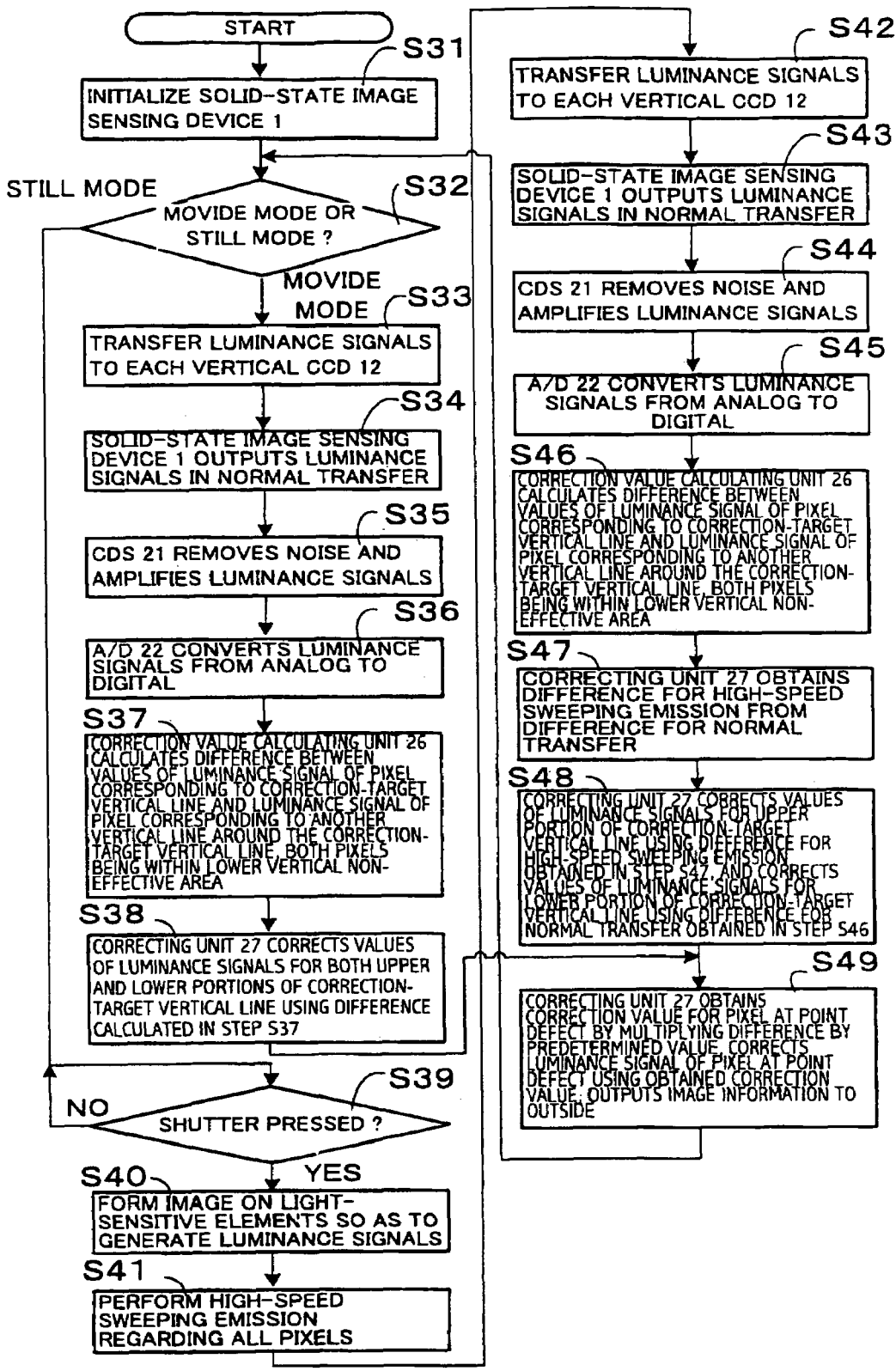
FIG. 6 shows a procedure for a second image shooting operation performed by the imaging system in Embodiment 1 of the present invention.

FIG. 6 shows a procedure for a second image shooting operation performed by the imaging system in Embodiment 1 of the present invention.

In the second image shooting operation, the correction value calculating unit 26 calculates a difference between values of luminance signals of pixels within the lower vertical non-effective area.

The following describes the procedure of the second image shooting operation.

(1) The solid-state image sensing device 1 is initialized, at the power-ON or the like (step S31). The initialization includes, for example, emission of electric charges from the light-sensitive elements 11, vertical CCDs 12, and horizontal CCD 13 or the like.

(2) It is judged whether the system is in the movie mode or the still mode (step S32).

(3) If it is judged that the system is in the movie mode, all luminance signals generated during each field as a result of light-to-electric conversion by the light-sensitive elements 11 are transferred to the vertical CCDs 12 all at once within the field (step S33).

(4) The solid-state image sensing device 1 outputs luminance signals in the normal transfer (step S34).

(5) The CDS 21 removes noise from the luminance signals output from the solid-state image sensing device 1, and amplifies the luminance signals (step S35).

(6) The A/D 22 converts the amplified analog luminance signals output from the CDS 21 into digital luminance signals, and outputs the digital luminance signals (step S36).

(7) The correction value calculating unit 26 calculates a difference between values of (i) a luminance signal that corresponds to a correction-target vertical line that is identified by an X address recorded by the address recording unit 25, and the pixel being within the lower vertical non-effective area and (ii) a luminance signal that corresponds to another vertical line around the correction-target vertical line and is within the lower vertical non-effective area (step S37)

(8) The correcting unit 27 corrects values of luminance signals for both the upper and lower portions of the correction-target vertical line using the difference calculated in step S37, and jumps to step S48 (step S38).

(9) In the case of the still mode, the system waits until the user presses the shutter (step S39).

It should be noted here that in the step S39, until the shutter is pressed, a video image may be shot in the movie mode and displayed on a Liquid Crystal Display monitor (not illustrated) of the main body of the imaging apparatus.

(10) After the shutter is pressed, light passes through a lens only for a predetermined time period corresponding to the set shutter speed, causing an image to be formed on the light-sensitive elements 11, which then performs the light-to-electric conversion on the formed image to generate luminance signals (step S40).

(11) The high-speed sweeping emission is performed in regards with all the pixels to emit electric charges from the vertical CCDs 12 and horizontal CCD 13 (step S41).

(12) The luminance signals generated in step S41 are transferred from the light-sensitive elements 11 to the vertical CCDs 12 (step S42).

(13) The solid-state image sensing device 1 outputs luminance signals in the normal transfer (step S43).

(14) The CDS 21 removes noise from the luminance signals output from the solid-state image sensing device 1, and amplifies the luminance signals (step S44).

(15) The A/D 22 converts the amplified analog luminance signals output from the CDS 21 into digital luminance signals, and outputs the digital luminance signals (step S45).

(16) The correction value calculating unit 26 calculates, as a difference for the normal transfer, a difference between values of (i) a luminance signal that corresponds to a correction-target vertical line that is identified by an X address recorded by the address recording unit 25, and the pixel being within the lower vertical non-effective area and (ii) a luminance signal that corresponds to another vertical line around the correction-target vertical line and is within the lower vertical non-effective area (step S46).

(17) The correcting unit 27 obtains a difference for the high-speed sweeping emission by multiplying the difference calculated in step S46 by a result value of "(transfer time during high-speed sweeping emission)/(normal transfer time)" (step S47).

(18) The correcting unit 27 divides the correction-target vertical line into the upper portion and the lower portion, corrects values of luminance signals for the upper portion of the correction-target vertical line using the difference for the high-speed sweeping emission obtained in step S47, and corrects values of luminance signals for the lower portion of the correction-target vertical line using the difference for the normal transfer obtained in step S46 (step S48).

(19) The correcting unit 27 obtains a correction value for a pixel at a point defect by multiplying a difference calculated by the correction value calculating unit 26 by a predetermined value, corrects a luminance signal of the pixel at the point defect using the obtained correction value, outputs image information to outside, and returns to step S32 (step S49).

Summary

As described above, the imaging system of Embodiment 1 can measure the amount of influence of the dark current generated with the presence of a point defect in a vertical CCD in real time, and remove the portion corresponding to the influence from the luminance signals. This can make the white vertical line or white defect in the displayed image less prominent with high accuracy, dealing with both the white defect and the high-speed sweeping emission.

Such an improvement enables the number of point defects in the vertical CCDs used in screening the products to be increased. This improves yields and reduces the production cost.

Embodiment 2

<Outline>

The invention in Embodiment 2 removes the portion corresponding to the influence of the dark current generated with the presence of a point defect in a vertical CCD, from the luminance signals and makes the vertical white line less prominent when a blur-by-hand correction function, which is disclosed in, for example, Japanese Laid-Open Patent Application No. 07-38799, is performed.

In the blur-by-hand correction function is performed, the number of pixels for the high-speed sweeping emission differs per field. As a result, the number of pixels for the high-speed sweeping emission is obtained from outside per field, luminance signals corresponding to the high-speed sweeping emission are identified from the obtained number and the address of a point defect in a vertical CCD, and the correction is made appropriately.

<Construction>

Figure 7:
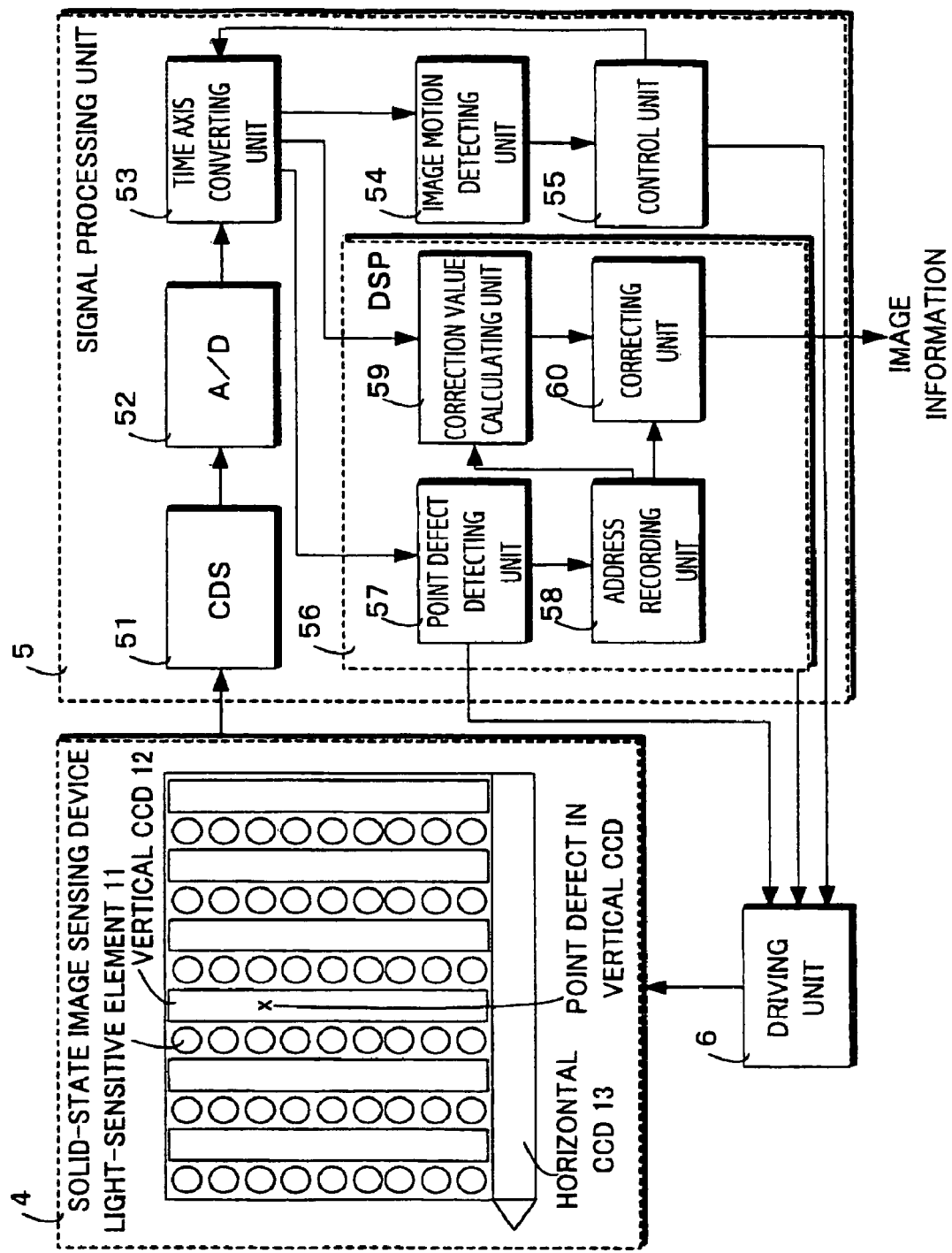
FIG. 7 shows the construction of an imaging system in Embodiment 2 of the present invention.

FIG. 7 shows the construction of an imaging system in Embodiment 2 of the present invention.

As shown in FIG. 7, the imaging system in Embodiment 2, which is embedded in an imaging apparatus such as a video camera or a digital still camera, receives light, allows the received light to pass through a lens to form an image by focusing, performs a light-to-electric conversion on the formed image, and outputs electric signals as the image information. The imaging system includes a solid-state image sensing device 4, a signal processing unit 5, and a driving unit 6.

The solid-state image sensing device 4 is the same as the solid-state image sensing device 1 in Embodiment 1.

The signal processing unit 5, which includes a CDS 51, an A/D 52, a time axis converting unit 53, an image motion detecting unit 54, a control unit 55, and a DSP 56, issues a driving instruction to the driving unit 6, receives luminance signals output from the solid-state image sensing device 4, processes the received luminance signals, and outputs image information to outside. The signal processing unit 5 includes The CDS 51 is the same as the CDS 21 in Embodiment 1.
The A/D 52 is the same as the A/D 22 in Embodiment 1.
The time axis converting unit 53, if an input digital luminance signal corresponds to a smaller size of an area on the screen than the desired size of the area, extends the display period of the luminance signal to a stipulated display period.

The image motion detecting unit 54 detects a motion in the image based on the input digital luminance signals.

The control unit 55 drives the driving unit 6 to control the range of the luminance signals output by the solid-state image sensing device 4, based on the motion detected by the image motion detecting unit 54. The control unit 55 also controls the range of the luminance signals output by the time axis converting unit 53.

The control unit 55 outputs values $\gamma 1$ and $\gamma 2$ per field when a blur-by-hand correction function is performed, where the value $\gamma 1$ represents the number of pixels that are emitted by a high-speed sweeping emission that is performed before luminance signals are transferred from the light-sensitive elements 11 to the vertical CCDs, and the value $\gamma 2$ represents the number of pixels that are emitted by a high-speed sweeping emission that is performed after luminance signals are transferred from the light-sensitive elements 11 to the vertical CCDs.

The DSP 56 generates image information by performing digital processing on the digital luminance signals output from the time axis converting unit 53.

As shown in FIG. 7, the DSP 56 includes a point defect detecting unit 57, an address recording unit 58, a correction value calculating unit 59, and a correcting unit 60.

The point defect detecting unit 57 is the same as the point defect detecting unit 24 in Embodiment 1.

The address recording unit 58 is the same as the address recording unit 25 in Embodiment 1.

The correction value calculating unit 59, during an image shooting, calculates, as a difference corresponding to the normal transfer time, either (a) a difference between values of (i) a luminance signal that corresponds to the correction-target vertical line and is within the upper vertical non-effective area and (ii) a luminance signal that corresponds to a predetermined position on another vertical line around the correction-target vertical line and is within the upper vertical non-effective area, or (b) a difference between values of (i) a luminance signal that corresponds to the correction-target vertical line and is within the lower vertical non-effective area and (ii) a luminance signal that corresponds to a predetermined position on another vertical line around the correction-target vertical line and is within the lower vertical non-effective area.

The correcting unit 60, when the blur-by-hand correction function is performed, receives during each field from the control unit 55 a value indicating the number of pixels that are outside the effective pixel area and for which luminance signals are to be emitted by a high-speed sweeping emission, and obtains a difference corresponding to the high-speed sweeping emission by converting the difference corresponding to the normal transfer time calculated by the correction value calculating unit 59, using a ratio between a transfer time in the high-speed sweeping emission and the normal transfer time. The correcting unit 60 then performs the correction by subtracting the calculated difference corresponding to the normal transfer time from each value of luminance signals that are among the luminance signals corresponding to the correction-target vertical line, excluding a luminance signal for a pixel at the recorded Y address and as many luminance signals for pixels adjacent to the pixel at the Y address as indicated by the value received from the control unit 55, and by subtracting the calculated difference corresponding to the high-speed sweeping emission from each value of luminance signals that are among the luminance signals corresponding to the correction-target vertical line and are as many luminance signals adjacent to the pixel of the recorded Y address as indicated by the value received from the control unit 55.

This will be explained in more detail with a concrete example. When the blur-by-hand correction function is performed, the correcting unit 60 receives, from the control unit 55, the values γ1 and γ2 per field, where the value γ1 represents the number of pixels that are emitted by a high-speed sweeping emission that is performed before luminance signals are transferred from the light-sensitive elements 11 to the vertical CCDs, and the value γ2 represents the number of pixels that are emitted by a high-speed sweeping emission that is performed after luminance signals are transferred from the light-sensitive elements 11 to the vertical CCDs. In regards with the point defect A (100, 100), the correcting unit 60 converts the difference α2 using the following equation:

Converted difference −μ2×10 μs/100 μs=α2/10.

The correcting unit 60 then subtracts the difference α2 from each value of the luminance signals that correspond to vertical sequences of pixels (100, 0) to (100, 99−γ1) and (100, 101+γ2) to (100, 299). The correcting unit 60 also subtracts the converted difference "α2/10" from each value of the luminance signals that correspond to vertical sequences of pixels (100, 100−γ1) to (100, 99) and (100, 101) to (100, 100+γ2). Similarly, in regards with the point defect B (300, 200), the correcting unit 60 calculates a converted difference "β2/10" by converting the difference β2. The correcting unit 60 then subtracts the difference β2 from each value of the luminance signals that correspond to vertical sequences of pixels (300, 0) to (300, 199−γ1) and (300, 201+γ2) to (300, 299). The correcting unit 60 also subtracts the converted difference "β2/10" from each value of the luminance signals that correspond to vertical sequences of pixels (300, 200−γ1) to (300, 199) and (300, 201) to (300, 200+γ2).

The correcting unit 60 further obtains a correction value for a pixel at a point defect by multiplying a difference calculated by the correction value calculating unit 59 by a predetermined value, and corrects a luminance signal of the pixel at the point defect using the obtained correction value.

For detailed example of the correction regarding the luminance signal of the pixel at the point defect by the correcting unit 60, refer to an example provided in Embodiment 1.

The driving unit 6 drives the solid-state image sensing device 4 in accordance with a driving instruction issued by the signal processing unit 5.

When the blur-by-hand correction function is performed, the driving unit 6 receives, from the control unit 55, the values γ1 and γ2 that each represent the number of pixels that are emitted by a high-speed sweeping emission, and drives the solid-state image sensing device 4 while controlling the range of luminance signals output by the solid-state image sensing device 4.

Figure 8A:
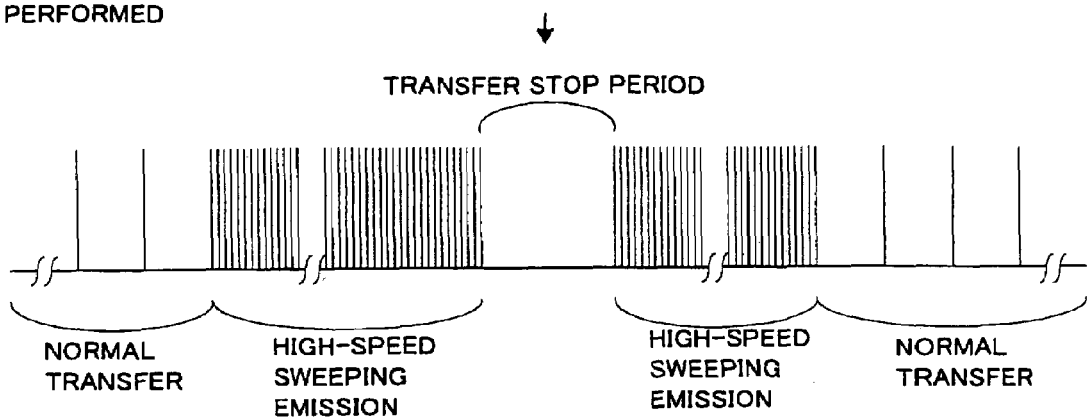
FIG. 8A is a schematic view of transfer pulses observed during the vertical transfer performed by the vertical CCDs when the blur-by-hand correction function is performed.

FIG. 8A is a schematic view of transfer pulses observed during the vertical transfer performed by the vertical CCDs when the blur-by-hand correction function is performed.

Figure 8B:
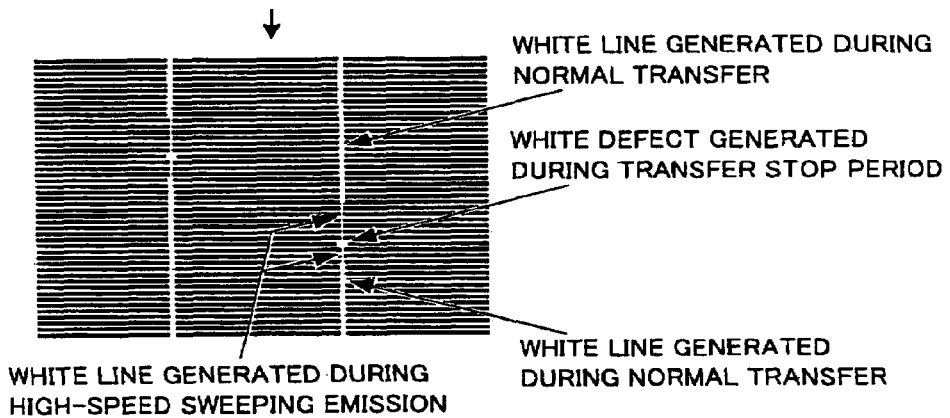
FIG. 8B is a schematic view of an image without a correction of defects displayed when the blur-by-hand correction function is performed.
Figure 8C:
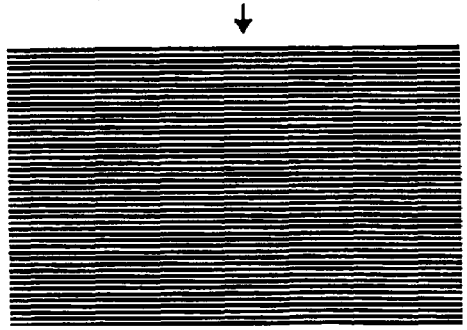
FIG. 8C is a schematic view of an image displayed after the defects are corrected when the blur-by-hand correction function is performed.

FIG. 8B is a schematic view of an image without a correction of defects displayed when the blur-by-hand correction function is performed. FIG. 8C is a schematic view of an image displayed after the defects are corrected when the blur-by-hand correction function is performed.

<Operation>

The procedure for detecting point defects in the vertical CCDs is the same as that in Embodiment 1.

Figure 9:
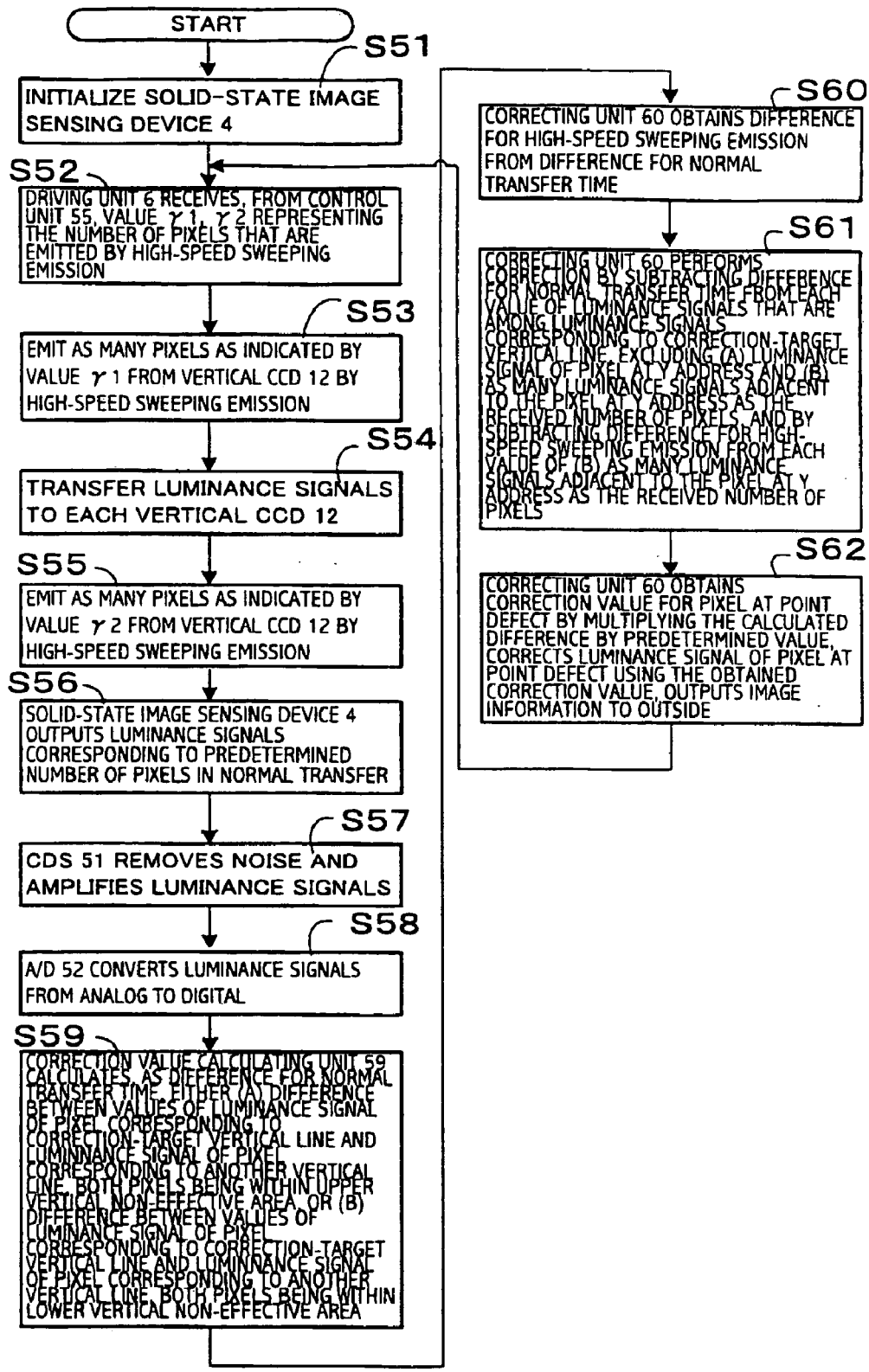
FIG. 9 shows a procedure for an image shooting operation when the blur-by-hand correction function is performed, by the imaging system in Embodiment 2 of the present invention.

FIG. 9 shows a procedure for an image shooting operation when the blur-by-hand correction function is performed, by the imaging system in Embodiment 2 of the present invention.

The following describes the procedure for an image shooting operation when the blur-by-hand correction function is performed.

(1) The solid-state image sensing device 4 is initialized, at the power-ON or the like (step S51). The initialization includes, for example, emission of electric charges from the light-sensitive elements 11, vertical CCDs 12, and horizontal CCD 13 or the like.

(2) The driving unit 6 receives, from the control unit 55, values γ1 and γ2 which each represent the number of pixels that are emitted by the high-speed sweeping emission (step S52).

(3) The driving unit 6 drives the solid-state image sensing device 4 so as to emit as many pixels as indicated by value γ1 received in step S52 from the vertical CCDs 12 in the high-speed sweeping emission (step S53).

(4) All luminance signals generated during each field as a result of light-to-electric conversion by the light-sensitive elements 11 are transferred to the vertical CCDs 12 all at once within the field (step S54).

(5) The driving unit 6 drives the solid-state image sensing device 4 so as to emit as many pixels as indicated by value γ2 received in step S52 from the vertical CCDs 12 in the high-speed sweeping emission (step S55).

(6) The solid-state image sensing device 4 outputs a predetermined number of luminance signals in the normal transfer (step S56).

(7) The CDS 51 removes noise from the luminance signals output from the solid-state image sensing device 4, and amplifies the luminance signals (step S57).

(8) The A/D 52 converts the amplified analog luminance signals output from the CDS 51 into digital luminance signals, and outputs the digital luminance signals (step S58).

(9) The correction value calculating unit 59 calculates, as a difference corresponding to the normal transfer time, either (a) a difference between values of (i) a luminance signal that corresponds to the correction-target vertical line and is within the upper vertical non-effective area and (ii) a luminance signal that corresponds to a predetermined position on another vertical line around the correction-target vertical line and is within the upper vertical non-effective area, or (b) a difference between values of (i) a luminance signal that corresponds to the correction-target vertical line and is within the lower vertical non-effective area and (ii) a luminance signal that corresponds to a predetermined position on another vertical line around the correction-target vertical line and is within the lower vertical non-effective area (step S59).

(10) The correcting unit 60 obtains a difference corresponding to a high-speed sweeping emission by converting the difference corresponding to the normal transfer time calculated by the correction value calculating unit 59, using a ratio between a transfer time in the high-speed sweeping emission and the normal transfer time (step S60).

(11) The correcting unit 60 performs the correction by subtracting the calculated difference corresponding to the normal transfer time from each value of luminance signals that are among the luminance signals corresponding to the correction-target vertical line, excluding a luminance signal for a pixel at the recorded Y address and as many luminance signals for pixels adjacent to the pixel at the Y address as the number of pixels emitted in the high-speed sweeping emission, and by subtracting the calculated difference corresponding to the high-speed sweeping emission from each value of luminance signals that are among the luminance signals corresponding to the correction-target vertical line and areas many luminance signals adjacent to the pixel of the recorded Y address as the number of pixels emitted in the high-speed sweeping emission (step S61).

(12) The correcting unit 60 obtains a correction value for a pixel at a point defect by multiplying a difference calculated by the correction value calculating unit 59 by a predetermined value, corrects a luminance signal of the pixel at the point defect using the obtained correction value, outputs image information to outside, and returns to step S52 (step S62).

<Summary>

As described above, the imaging system of Embodiment 2 can measure the amount of influence of the dark current generated with the presence of a point defect in a vertical CCD in real time using the vertical non-effective area when the blur-by-hand correction function is performed, calculate a difference corresponding to the high-speed sweeping emission, and remove the portion corresponding to the influence from the luminance signals. This can make the white vertical line or white defect in the displayed image less prominent with high accuracy, dealing with both the white defect and the high-speed sweeping emission.

Such an improvement enables the number of point defects in the vertical CCDs used in screening the products to be increased. This improves yields and reduces the production cost.

Variation 1

Currently, the need for high-resolution still images is increasing. On the other hand, there is a limit to the resolution of video images due to the limit to the data transfer time.

There is also a demand for changing the resolution during an image shooting regardless of still or video.

Imaging apparatuses that came on the market from such demands include an imaging apparatus that can shoot both still and video images, with still images having a higher resolution than video images, and an imaging apparatus with which the user can change the resolution as necessary during use.

Such imaging apparatuses have solid-state image sensing devices that have as many pixels as are enough to achieve the highest-solution for still images. When shooting still images with the highest resolution, the imaging apparatuses output a luminance signal per light-sensitive element, but when shooting video images or still images with lower resolutions, the imaging apparatuses output a luminance signal per a group of adjacent light-sensitive elements.

The present invention also can be varied to meet such demands by adding, to the elements constituting Embodiment 1 or 2, means for selecting a resolution and means for converting the address of the point defect.

Of these, a variation of Embodiment 1 will be described as Variation 1.

Figure 10:
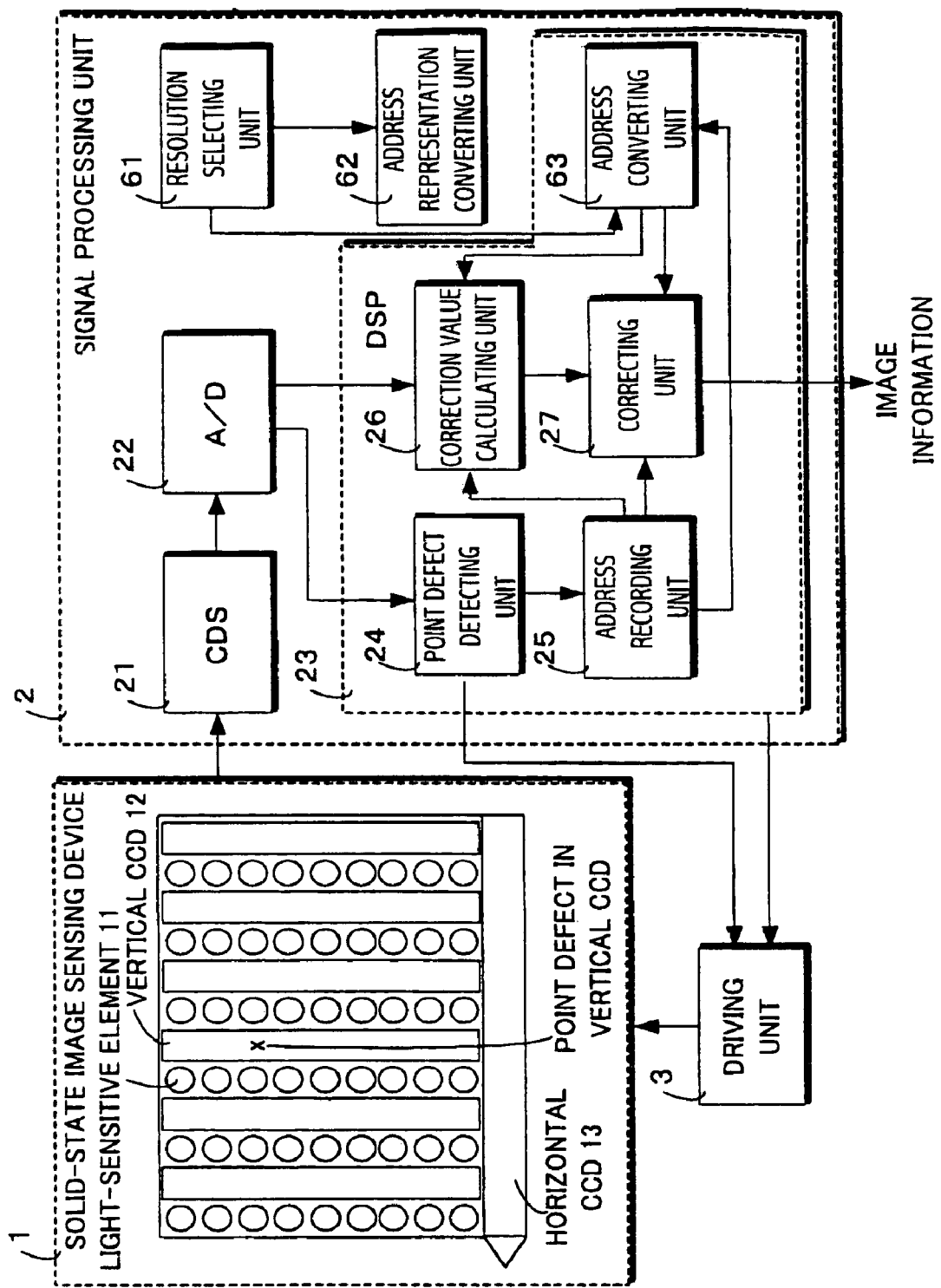
FIG. 10 shows the construction of an imaging system in Variation 1 of the present invention.

FIG. 10 shows the construction of an imaging system in Variation 1 of the present invention.

As shown in FIG. 10, the imaging system in Variation 1 includes a resolution selecting unit 61, an address representation converting unit 62, and an address converting unit 63 in addition to the components of the imaging system in Embodiment 1.

The resolution selecting unit 61 selects a standard mode or a mix mode, wherein in the standard mode, a luminance signal is output in correspondence with an electric charge output from each light-sensitive element, and in the mix mode, a luminance signal is output in correspondence with a mixture of electric charges output from a predetermined number of light-sensitive elements.

The selection of the mode will be explained by taking, as an example, a solid-state image sensing device that has a 1,080,000 pixel resolution (900 vertical pixels by 1,200 is horizontal pixels). It is supposed here that the example includes 1,080,000 light-sensitive elements 11, 1,200 vertical CCDs 12, and one horizontal CCD 13. The address of each pixel in the standard mode is represented by (X address, Y address)=(n1, m1) The X address "n1" takes a value ranging from "0" to "1199", and the Y address "m1" takes a value ranging from "0" to "899". In a plane in which the pixels are arranged, the X address "n1" increases as the pixel position moves from left to right, and the Y address "m1" increases as the pixel position moves from top to bottom. In vertical transfers, the first transfer from the vertical CCDs to the horizontal CCD includes 1,200 luminance signals for pixels (0, 0), (1, 0), . . . (1199, 0) on the same horizontal line. The second transfer includes luminance signals for pixels (0, 1), (1, 1), . . . (1199, 1) on the same horizontal line. Transfers continue in a similar manner, and the last transfer includes luminance signals (0, 899), (1, 899), . . . (1199, 899) on the same horizontal line.

In the following description, it is presumed that a point defect Al has an address (301, 303) and a point defect B1 has an address (902, 607).

It is supposed here that in the mix mode, a luminance signal is output in correspondence with a mixture of electric charges output from 9 light-sensitive elements (3 vertical elements by 3 horizontal elements). That is to say, in the mix mode, the solid-state image sensing device is driven as a solid-state image sensing device that has a 120,000 pixel resolution (300 vertical pixels by 400 horizontal pixels).

The address representation converting unit 62 converts address representation for the standard mode into address representation for the mix mode if the mix mode is selected.

More specifically, the address representation converting unit 62 converts the address for the standard mode, which ranges from (0, 0) to (1199, 899), into the address for the mix mode, which ranges from (0, 0) to (399, 299).

The address converting unit 63, if the mix mode is selected, converts each address of point defects recorded in the address recording unit 25 into each converted address by performing a predetermined conversion process on the recorded address of point defect. The converted address conform to the address representation for the mix mode and identifies the point defect.

The predetermined conversion process in the above-mentioned address conversion include: (1) add "1" to the recorded address, (2) divide by the number of mixed pixels, and (3) drop the remainder, or drop the fractional portion.

The predetermined conversion process will be explained in more detail. The point defect A1 (301, 303) in the standard mode is converted as follows: regarding the X address, (1) 301+1=302, (2) 302/3 (the number of mixed pixels in the horizontal direction)=100, remainder 2, and (3) dropping the remainder "2" leaves "100"; and regarding the Y address, (1) 303+1=304, (2) 304/3 (the number of mixed pixels in the vertical direction)=101, remainder 1, and (3) dropping the remainder "1" leaves "101". As a result, the address of the point defect A2 in the mix mode, which corresponds to the address of the point defect A1 (301, 303) in the standard mode, is (100, 101).

Similarly, the point defect B1 (902, 607) in the standard mode is converted as follows: regarding the X address, (1) 902+1=903, (2) 903/3=301, remainder 0, and (3) "301" is obtained due to no remainder; and regarding the Y address, (1) 607+1=608, (2) 608/3 (the number of mixed pixels in the vertical direction)=202, remainder 2, and (3) dropping the remainder "2" leaves "202". As a result, the address of the point defect B2 in the mix mode, which corresponds to the address of the point defect B1 (902, 607) in) the standard mode, is (301, 202).

The point defect detecting unit 24 and the correcting unit 27 use the converted addresses generated by the address converting unit 63 if the mix mode is selected.

Variation 2

In the imaging systems of Embodiment 1 or 2 or variation 1, the number of transferred luminance signals in the vertical direction (that is to say, the number of horizontal lines each of which corresponds to one vertical transfer) for one screen may be larger than the number of luminance signals in the vertical direction (that is to say, the number of horizontal lines) in a real area that is composed of the effective pixel area, the vertical light-shielded area, and the vertical dummy area. When this happens, luminance signals outside the real area include empty transfer signals that do not correspond to any portion of the real area. In such a case, the correction value calculating unit may calculate, as the correction value, a difference between values of (i) an empty signal contained in a luminance signal corresponding to the correction-target vertical line and (ii) an empty signal contained in a luminance signal corresponding to another vertical line that is not a correction target.

More specifically, suppose that the number of horizontal lines in the real area is represented as "M", and the number of horizontal lines for one screen is represented as "N" Then, if M=N, all the output luminance signals correspond to any portion of the real area; but if N>M, though luminance signals output with the first to $M^{th}$ horizontal lines correspond to any portion of the real area, luminance signals output with the $(M+1)^{th}$ to $N^{th}$ horizontal lines, namely luminance signals output with (N−M) horizontal lines, are empty transfer signals that do not correspond to any portion of the real area.

Furthermore, the empty transfer signals are output after the luminance signals for the M horizontal lines, which correspond to the real area, are output. As a result, the output empty transfer signals include luminance signal components that are ascribable to a point defect that exists in a portion of the vertical CCDs corresponding to the M horizontal lines. In addition, in the transfer corresponding to the $(M+1)^{th}$ to $N^{th}$ horizontal lines, luminance signals output from the vertical CCDs in the real area are not transferred, and no new luminance signal component is added. As a result, each empty transfer signal has approximately the same components as the luminance signals output from the horizontal lines via the vertical CCDs.

It should be noted here that the reason why the expression "approximately the same" is used is that luminance signal components obtained when, for example, two luminance signals corresponding to the same portion are not necessarily the same due to a fluctuation in the time domain, and in the vertical CCDs, the influence of the difference may become as large as cannot be neglected.

Suppose, for example, that M>L, and a point defect exists in a vertical CCD corresponding to the $L^{th}$ horizontal line, causing each luminance signal that passes through the point defect to be increased. In such a case, each luminance signal is not necessarily increased by the same value, and as large a value as cannot be neglected may be added due to a fluctuation in the domain of temperature or time.

If the empty transfer signals are used to calculate the correction value, errors due to the fluctuation in the time domain can be removed, and the accuracy of the correction value can be increased. The following will explain this in more detail.

The luminance signals corresponding to the real area including the M horizontal lines are output per horizontal line. The luminance signals corresponding to the $(M+1)^{th}$ to $N^{th}$ horizontal lines have approximately the same components and errors due to the fluctuation in the time domain.

It is accordingly possible to remove only the errors due to the fluctuation in the time domain without the influence in the space domain, by averaging the luminance signals corresponding to the $(M+1)^{th}$ to $N^{th}$ horizontal lines. In the averaging the empty transfer signals, luminance signals corresponding to the $M^{th}$ horizontal line for the real area may be included.

In some cases, the vertical dummy area at the lower side of the screen does not exist or has a small number of horizontal lines, mainly for the purpose of reducing the chip size. In such cases, luminance signals corresponding to the vertical dummy area cannot be used for the calculation of a correction value, but the empty transfer signals can be used instead for the calculation.

It should be noted here that when a correction value is calculated using the empty transfer signals, a conversion equation based on a ratio of the transfer time of the empty transfer signals is used, as is the case with the calculation of a correction value using the vertical light-shielded area and the vertical dummy area.

The correction value calculating unit may calculate, as the correction value, a difference between (a) any of (i) a value of a luminance signal corresponding to a position on the correction-target vertical line within a vertical light-shielded area that is outside an effective pixel area, (ii) a value of a luminance signal corresponding to a position on the correction-target vertical line within a vertical dummy area that does not have any light-sensitive element, and (iii) a value obtained by performing a calculation using values of (iii-1) the luminance signal corresponding to a position on the correction-target vertical line within the vertical light-shielded area, and (iii-2) the luminance signal corresponding to a position on the correction-target vertical line within the vertical dummy area, and (b) any of (iv) a value of a luminance signal corresponding to a position on another vertical line, that is not a correction target, within the vertical light-shielded area, (v) a value of a luminance signal corresponding to a position on another vertical line, that is not a correction target, within the vertical dummy area, and (vi) a value obtained by performing a calculation using values of (vi-1) the luminance signal corresponding to a position on another vertical line within the vertical light-shielded area and (vi-2) the luminance signal corresponding to a position on another vertical line within the vertical dummy area.

Also, the correction value calculating unit may calculate, as the correction value, a difference between (a) any of (i) a value of a luminance signal corresponding to a position on the correction-target vertical line within a vertical light-shielded area that is outside an effective pixel area, (ii) a value of a luminance signal corresponding to a position on the correction-target vertical line within a vertical dummy area that does not have any light-sensitive element, (iii) a value of an empty transfer signal corresponding to a position on the correction-target vertical line, and (iv) a value obtained by performing a calculation using values of at least two of (iv-1) the luminance signal corresponding to a position on the correction-target vertical line within the vertical light-shielded area, (iv-2) the luminance signal corresponding to a position on the correction-target vertical line within the vertical dummy area, and (iv-3) the empty transfer signal corresponding to a position on the correction-target vertical line, and (b) any of (v) a value of a luminance signal corresponding to a position on another vertical line, that is not a correction target, within the vertical light-shielded area, (vi) a value of a luminance signal corresponding to a position on another vertical line, that is not a correction target, within the vertical dummy area, (vii) a value of an empty transfer signal corresponding to a position on another vertical line, and (viii) a value obtained by performing a calculation using values of at least two of (viii-1) the luminance signal corresponding to a position on another vertical line within the vertical light-shielded area, (viii-2) the luminance signal corresponding to a position on another vertical line within the vertical dummy area, and (viii-3) the empty transfer signal corresponding to a position on another vertical line.

INDUSTRIAL APPLICABILITY

The present invention can be applicable to imaging apparatuses such as home video cameras and digital still cameras. The present invention provides a solid-state image sensing device that can make a vertical white line on the screen less prominent and contributes to improvement in image quality of the imaging apparatuses.

The effect of making a vertical white line on the screen less prominent can increase the number of point defects in the vertical CCDs used in screening the products. This improves yields and reduces the production cost, contributing to decrease in the price of the imaging apparatuses.

The present invention is also applicable to variable imaging apparatuses, not limited to those intended for home use.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image defect correction apparatus that processes luminance signals output from two-dimensionally arranged light-sensitive elements via a plurality of vertical charge coupled devices and a horizontal charge coupled device in a predetermined order, and outputs image information, the image defect correction apparatus comprising:

a recording unit operable to record therein an X address for identifying a correction-target vertical line of pixels that corresponds to a vertical charge coupled device in which a point defect exists;

a correction value calculating unit operable to calculate a correction value from values of (i) a luminance signal corresponding to at least one pixel at a predetermined position on the correction-target vertical line identified by the recorded X address and (ii) a luminance signal corresponding to at least one pixel at a predetermined position on another vertical line that is not a correction target; and a correcting unit operable to correct values of luminance signals corresponding to the correction-target vertical line, based on the calculated correction value, wherein the correction value calculating unit calculates, as the correction value, a difference between (a) any of (i) a value of a luminance signal corresponding to a position on the correction-target vertical line within a vertical light-shielded area that is outside an effective pixel area, (ii) a value of a luminance signal corresponding to a position on the correction-target vertical line within a vertical dummy area that does not have any light-sensitive element, and (iii) a value obtained by performing a calculation using values of (iii-1) the luminance signal corresponding to a position on the correction-target vertical line within the vertical light-shielded area, and (iii-2) the luminance signal corresponding to a position on the correction-target vertical line within the vertical dummy area, and (b) any of (iv) a value of a luminance signal corresponding to a position on another vertical line, that is not a correction target, within the vertical light-shielded area, (v) a value of a luminance signal corresponding to a position on another vertical line, that is not a correction target, within the vertical dummy area, and (vi) a value obtained by performing a calculation using values of (vi-1) the luminance signal corresponding to a position on another vertical line within the vertical light-shielded area and (vi-2) the luminance signal corresponding to a position on another vertical line within the vertical dummy area.

2. The image defect correction apparatus of claim 1, wherein the number of transferred luminance signals in the vertical direction is larger than the number of luminance signals in the vertical direction in a real area that is composed of the effective pixel area, the vertical light-shielded area, and the vertical dummy area, and luminance signals outside the real area include empty transfer signals that do not correspond to any portion of the real area, wherein the correction value calculating unit calculates, as the correction value, a difference between (a) any of (i) a value of a luminance signal corresponding to a position on the correction-target vertical line within a vertical light-shielded area that is outside an effective pixel area, (ii) a value of a luminance signal corresponding to a position on the correction-target vertical line within a vertical dummy area that does not have any light-sensitive element, (iii) a value of an empty transfer signal corresponding to a position on the correction-target vertical line, and (iv) a value obtained by performing a calculation using values of at least two of (iv-1) the luminance signal corresponding to a position on the correction-target vertical line within the vertical light-shielded area, (iv-2) the luminance signal corresponding to a position on the correction-target vertical line within the vertical dummy area, and (iv-3) the empty transfer signal corresponding to a position on the correction-target vertical line, and (b) any of (v) a value of a luminance signal corresponding to a position on another vertical line, that is not a correction target, within the vertical light-shielded area, (vi) a value of a luminance signal corresponding to a position on another vertical line, that is not a correction target, within the vertical dummy area, (vii) a value of an empty transfer signal corresponding to a position on another vertical line, and (viii) a value obtained by performing a calculation using values of at least two of (viii-1) the luminance signal corresponding to a position on another vertical line within the vertical light-shielded area, (viii-2) the luminance signal corresponding to a position on another vertical line within the vertical dummy area, and (viii-3) the empty transfer signal corresponding to a position on another vertical line.

3. The image defect correction apparatus of claim 2, wherein the correcting unit corrects values of luminance signals corresponding to the correction-target vertical line, based on the calculated difference in real time.

4. The image defect correction apparatus of claim 3, wherein the recording unit further records therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target and (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target and (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

5. The image defect correction apparatus of claim 3, wherein the recording unit further records therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit obtains, by a predetermined calculation, either the first or second difference not having been calculated, from either the first or second difference having been calculated, and obtains, by a predetermined calculation, either the third or fourth difference not having been calculated, from either the third or fourth difference having been calculated, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

6. The image defect correction apparatus of claim 5, wherein the correcting unit, when a still image is shot, obtains, by a calculation using a conversion equation that is based on a ratio between a transfer time in a high-speed sweeping emission and a normal transfer time, either the first or second difference not having been calculated, from either the first or second difference having been calculated, and obtains, by the calculation using the conversion equation, either the third or fourth difference not having been calculated, from either the third or fourth difference having been calculated.

7. The image defect correction apparatus of claim 3, wherein the recording unit further records therein a Y address for identifying a position of the point defect on the correction-target vertical line, and the correction value calculating unit operable to calculate either (a) (a-1) a difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, where the calculated difference corresponds to a normal transfer time, and the correcting unit, when a blur-by-hand correction function is performed, obtains a difference corresponding to a high-speed sweeping emission by converting the calculated difference corresponding to the normal transfer time using a ratio between a transfer time in the high-speed sweeping emission and the normal transfer time, obtains the number of pixels that are outside the effective pixel area and emitted in the high-speed sweeping emission, and performs the correction by subtracting the calculated difference corresponding to the normal transfer time from each value of luminance signals that are among the luminance signals corresponding to the correction-target vertical line, excluding as many luminance signals adjacent to a pixel of the recorded Y address as the number of pixels emitted in the high-speed sweeping emission, and by subtracting the calculated difference corresponding to the high-speed sweeping emission from each value of luminance signals that are among the luminance signals corresponding to the correction-target vertical line and are as many luminance signals adjacent to the pixel of the recorded Y address as the number of pixels emitted in the high-speed sweeping emission.

8. The image defect correction apparatus of claim 1, wherein the correcting unit corrects values of luminance signals corresponding to the correction-target vertical line, based on the calculated difference in real time.

9. The image defect correction apparatus of claim 8, wherein the recording unit further records therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target and (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target and (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

10. The image defect correction apparatus of claim 8, wherein the recording unit further records therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit obtains, by a predetermined calculation, either the first or second difference not having been calculated, from either the first or second difference having been calculated, and obtains, by a predetermined calculation, either the third or fourth difference not having been calculated, from either the third or fourth difference having been calculated, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

11. The image defect correction apparatus of claim 10, wherein the correcting unit, when a still image is shot, obtains, by a calculation using a conversion equation that is based on a ratio between a transfer time in a high-speed sweeping emission and a normal transfer time, either the first or second difference not having been calculated, from either the first or second difference having been calculated, and obtains, by the calculation using the conversion equation, either the third or fourth difference not having been calculated, from either the third or fourth difference having been calculated.

12. The image defect correction apparatus of claim 8, wherein the recording unit further records therein a Y address for identifying a position of the point defect on the correction-target vertical line, and the correction value calculating unit operable to calculate either (a) (a-1) a difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, where the calculated difference corresponds to a normal transfer time, and the correcting unit, when a blur-by-hand correction function is performed, obtains a difference corresponding to a high-speed sweeping emission by converting the calculated difference corresponding to the normal transfer time using a ratio between a transfer time in the high-speed sweeping emission and the normal transfer time, obtains the number of pixels that are outside the effective pixel area and emitted in the high-speed sweeping emission, and performs the correction by subtracting the calculated difference corresponding to the normal transfer time from each value of luminance signals that are among the luminance signals corresponding to the correction-target vertical line, excluding as many luminance signals adjacent to a pixel of the recorded Y address as the number of pixels emitted in the high-speed sweeping emission, and by subtracting the calculated difference corresponding to the high-speed sweeping emission from each value of luminance signals that are among the luminance signals corresponding to the correction-target vertical line and are as many luminance signals adjacent to the pixel of the recorded Y address as the number of pixels emitted in the high-speed sweeping emission.

13. The image defect correction apparatus of claim 1, wherein the correction value calculating unit calculates, as the correction value, (a) a difference between values of (i) a luminance signal corresponding to a position on the correction-target vertical line within a vertical light-shielded area that is outside an effective pixel area and (ii) a luminance signal corresponding to a position on another vertical line, that is not a correction target, within the vertical light-shielded area, (b) a difference between values of (iii) a value of a luminance signal corresponding to a position on the correction-target vertical line within a vertical dummy area that does not have any light-sensitive element and (iv) a luminance signal corresponding to a position on another vertical line, that is not a correction target, within the vertical dummy area, or (c) a difference between (v) a value obtained by performing a calculation using values of (v-1) the luminance signal corresponding to a position on the correction-target vertical line within the vertical light-shielded area, and (v-2) the luminance signal corresponding to a position on the correction-target vertical line within the vertical dummy area and (vi) a value obtained by performing a calculation using values of (vi-1) the luminance signal corresponding to a position on another vertical line within the vertical light-shielded area and (vi-2) the luminance signal corresponding to a position on another vertical line within the vertical dummy area.

14. The image defect correction apparatus of claim 13, wherein the number of transferred luminance signals in the vertical direction is larger than the number of luminance signals in the vertical direction in a real area that is composed of the effective pixel area, the vertical light-shielded area, and the vertical dummy area, and luminance signals outside the real area include empty transfer signals that do not correspond to any portion of the real area, wherein the correction value calculating unit calculates, as the correction value, (a) a difference between values of (i) a luminance signal corresponding to a position on the correction-target vertical line within a vertical light-shielded area that is outside an effective pixel area and (ii) a luminance signal corresponding to a position on another vertical line, that is not a correction target, within the vertical light-shielded area, (b) a difference between values of (iii) a value of a luminance signal corresponding to a position on the correction-target vertical line within a vertical dummy area that does not have any light-sensitive element and (iv) a luminance signal corresponding to a position on another vertical line, that is not a correction target, within the vertical dummy area, (c) a difference between values of (v) a value of an empty transfer signal corresponding to a position on the correction-target vertical line and (vi) a value of an empty transfer signal corresponding to a position on another vertical line, or (d) a difference between (vii) a value obtained by performing a calculation using values of at least two of (vii-1) the luminance signal corresponding to a position on the correction-target vertical line within the vertical light-shielded area, (vii-2) the luminance signal corresponding to a position on the correction-target vertical line within the vertical dummy area, and (vii-3) the empty transfer signal corresponding to a position on the correction-target vertical line and (viii) a value obtained by performing a calculation using values of at least two of (viii-1) the luminance signal corresponding to a position on another vertical line within the vertical light-shielded area, (viii-2) the luminance signal corresponding to a position on another vertical line within the vertical dummy area, and (viii-3) the empty transfer signal corresponding to a position on another vertical line.

15. The image defect correction apparatus of claim 14, wherein the correcting unit corrects values of luminance signals corresponding to the correction-target vertical line, based on the calculated difference in real time.

16. The image defect correction apparatus of claim 15, wherein the recording unit further records therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target and (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target and (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

17. The image defect correction apparatus of claim 15, wherein the recording unit further records therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit obtains, by a predetermined calculation, either the first or second difference not having been calculated, from either the first or second difference having been calculated, and obtains, by a predetermined calculation, either the third or fourth difference not having been calculated, from either the third or fourth difference having been calculated, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

18. The image defect correction apparatus of claim 17, wherein the correcting unit, when a still image is shot, obtains, by a calculation using a conversion equation that is based on a ratio between a transfer time in a high-speed sweeping emission and a normal transfer time, either the first or second difference not having been calculated, from either the first or second difference having been calculated, and obtains, by the calculation using the conversion equation, either the third or fourth difference not having been calculated, from either the third or fourth difference having been calculated.

19. The image defect correction apparatus of claim 15, wherein the recording unit further records therein a Y address for identifying a position of the point defect on the correction-target vertical line, and the correction value calculating unit operable to calculate either (a) (a-1) a difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, where the calculated difference corresponds to a normal transfer time, and the correcting unit, when a blur-by-hand correction function is performed, obtains a difference corresponding to a high-speed sweeping emission by converting the calculated difference corresponding to the normal transfer time using a ratio between a transfer time in the high-speed sweeping emission and the normal transfer time, obtains the number of pixels that are outside the effective pixel area and emitted in the high-speed sweeping emission, and performs the correction by subtracting the calculated difference corresponding to the normal transfer time from each value of luminance signals that are among the luminance signals corresponding to the correction-target vertical line, excluding as many luminance signals adjacent to a pixel of the recorded Y address as the number of pixels emitted in the high-speed sweeping emission, and by subtracting the calculated difference corresponding to the high-speed sweeping emission from each value of luminance signals that are among the luminance signals corresponding to the correction-target vertical line and are as many luminance signals adjacent to the pixel of the recorded Y address as the number of pixels emitted in the high-speed sweeping emission.

20. The image defect correction apparatus of claim 13, wherein the correcting unit corrects values of luminance signals corresponding to the correction-target vertical line, based on the calculated difference in real time.

21. The image defect correction apparatus of claim 20, wherein the recording unit further records therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target and (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target and (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

22. The image defect correction apparatus of claim 20, wherein the recording unit further records therein a Y address for identifying a position of the point defect on the correction-target vertical line, and the correction value calculating unit operable to calculate either (a) (a-1) a first difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a second difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a third difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a fourth difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, and the correcting unit obtains, by a predetermined calculation, either the first or second difference not having been calculated, from either the first or second difference having been calculated, and obtains, by a predetermined calculation, either the third or fourth difference not having been calculated, from either the third or fourth difference having been calculated, and the correcting unit performs the correction by subtracting the calculated first or third difference from each luminance signal corresponding to a portion of the correction-target vertical line that is higher than the recorded Y address, and by subtracting the calculated second or fourth difference from each luminance signal corresponding to a portion of the correction-target vertical line that is lower than the recorded Y address.

23. The image defect correction apparatus of claim 22, wherein the correcting unit, when a still image is shot, obtains, by a calculation using a conversion equation that is based on a ratio between a transfer time in a high-speed sweeping emission and a normal transfer time, either the first or second difference not having been calculated, from either the first or second difference having been calculated, and obtains, by the calculation using the conversion equation, either the third or fourth difference not having been calculated, from either the third or fourth difference having been calculated.

24. The image defect correction apparatus of claim 20, wherein the recording unit further records therein a Y address for identifying a position of the point defect on the correction-target vertical line, and the correction value calculating unit operable to calculate either (a) (a-1) a difference between values of (i) a luminance signal corresponding to an upper vertical light-shielded area that is placed higher than the effective pixel area on a screen and being on the correction-target vertical line and (ii) a luminance signal corresponding to the upper vertical light-shielded area and being on another vertical line that is not a correction target, or (a-2) a difference between values of (i) a luminance signal corresponding to a lower vertical light-shielded area that is placed lower than the effective pixel area on a screen and being on the correction-target vertical line and (ii) a luminance signal corresponding to the lower vertical light-shielded area and being on another vertical line that is not a correction target, or (b) (b-1) a difference between values of (i) a luminance signal corresponding to an upper vertical dummy area that is placed higher on a screen and being on the correction-target vertical line and (ii) a luminance signal corresponding to the upper vertical dummy area and being on another vertical line that is not a correction target, or (b-2) a difference between values of (i) a luminance signal corresponding to a lower vertical dummy area that is placed lower on a screen and being on the correction-target vertical line and (ii) a luminance signal corresponding to the lower vertical dummy area and being on another vertical line that is not a correction target, where the calculated difference corresponds to a normal transfer time, and the correcting unit, when a blur-by-hand correction function is performed, obtains a difference corresponding to a high-speed sweeping emission by converting the calculated difference corresponding to the normal transfer time using a ratio between a transfer time in the high-speed sweeping emission and the normal transfer time, obtains the number of pixels that are outside the effective pixel area and emitted in the high-speed sweeping emission, and performs the correction by subtracting the calculated difference corresponding to the normal transfer time from each value of luminance signals that are among the luminance signals corresponding to the correction-target vertical line, excluding as many luminance signals adjacent to a pixel of the recorded Y address as the number of pixels emitted in the high-speed sweeping emission, and by subtracting the calculated difference corresponding to the high-speed sweeping emission from each value of luminance signals that are among the luminance signals corresponding to the correction-target vertical line and are as many luminance signals adjacent to the pixel of the recorded Y address as the number of pixels emitted in the high-speed sweeping emission.

25. The image defect correction apparatus of claim 1, wherein the recording unit further records therein a Y address for identifying a position of the point defect on the correction-target vertical line, and the correcting unit further obtains a converted correction value by converting the calculated correction value based on a ratio between a normal transfer time and a time during which a transfer of luminance values is stopped, and the correcting unit corrects a value of the point defect identified by the recorded X address and Y address, based on the converted correction value.

26. The image defect correction apparatus of claim 1 further comprising a point defect detecting unit operable to, prior to an image shooting, detect point defects in the vertical charge coupled devices by stopping transferring luminance signals from the light-sensitive elements to the vertical charge coupled devices and also stopping a vertical transfer from the vertical charge coupled devices to the horizontal charge coupled device for a predetermined time period, and then outputting luminance signals, where output luminance signals having values not higher than a predetermined value are regarded as the point defects, and the point defect detecting unit records into the recording unit information regarding addresses of the detected point defects.

27. The image defect correction apparatus of claim 1, wherein the correcting unit judges, for each luminance signal to be corrected, whether a luminance signal is saturated, and does not correct luminance signals that are judged to be saturated.

28. The image defect correction apparatus of claim 1, wherein the correcting unit judges, for each luminance signal to be corrected, whether luminance signals surrounding the luminance signal to be corrected are saturated, and does not correct the luminance signal to be corrected if the luminance signals surrounding the luminance signal are judged to be saturated.

29. The image defect correction apparatus of claim 1, wherein the correcting unit, for each luminance signal to be corrected, judges whether a luminance signal is saturated, calculates an expected value which a saturated luminance signal is expected to have if a correction is made, compares the expected value with a value of a luminance signal in a vicinity of the saturated luminance signal, and replaces the value of the saturated luminance signal with the value of the luminance signal in the vicinity if the expected value of the saturated luminance signal is lower than the value of the luminance signal in the vicinity.

30. The image defect correction apparatus of claim 1 further comprising:

a mode selecting unit operable to select a standard mode or a mix mode, wherein in the standard mode, a luminance signal is output in correspondence with an electric charge output from each light-sensitive element, and in the mix mode, a luminance signal is output in correspondence with a mixture of electric charges output from a predetermined number of light-sensitive elements;

an address representation converting unit operable to convert address representation for the standard mode into address representation for the mix mode if the mix mode is selected; and an address converting unit operable to convert the recorded X address into a converted X address by performing a calculation using a predetermined conversion equation on the recorded X address, wherein the converted X address conforms to the address representation for the mix mode and identifies the correction-target vertical line corresponding to the point defect, wherein the correction value calculating unit and the correcting unit use the converted X address instead of the X address if the mix mode is selected.

* * * * *